United States Patent
Sinnwell et al.

(10) Patent No.: US 10,208,213 B2
(45) Date of Patent: Feb. 19, 2019

(54) DIP-COATING COMPOSITION FOR ELECTROCONDUCTIVE SUBSTRATES, COMPRISING A SOL-GEL COMPOSITION

(71) Applicants: BASF COATINGS GmbH, Muenster (DE); HENKEL AG & CO. KGAA, Duesseldorf (DE)

(72) Inventors: Sebastian Sinnwell, Duesseldorf (DE); Natalja Ott, Duesseldorf (DE); Christian Hammer, Duesseldorf (DE)

(73) Assignees: BASF COATINGS GmbH, Muenster (DE); HENKEL AG & CO. KGAA, Duesseldorf (DE)

( * ) Notice: Subject to any disclaimer, the term of this patent is extended or adjusted under 35 U.S.C. 154(b) by 323 days.

(21) Appl. No.: 14/911,646

(22) PCT Filed: Aug. 12, 2013

(86) PCT No.: PCT/EP2013/066830
§ 371 (c)(1),
(2) Date: Feb. 11, 2016

(87) PCT Pub. No.: WO2015/022007
PCT Pub. Date: Feb. 19, 2015

(65) Prior Publication Data
US 2016/0200921 A1    Jul. 14, 2016

(51) Int. Cl.
*C09D 5/08*     (2006.01)
*C09D 5/44*     (2006.01)
*C09D 183/08*   (2006.01)
*C08G 77/26*    (2006.01)

(52) U.S. Cl.
CPC ............ *C09D 5/4476* (2013.01); *C09D 5/08* (2013.01); *C09D 183/08* (2013.01); *C08G 77/26* (2013.01)

(58) Field of Classification Search
None
See application file for complete search history.

(56) References Cited

U.S. PATENT DOCUMENTS

| | | | | |
|---|---|---|---|---|
| 4,330,446 A * | 5/1982 | Miyosawa | ............... | B05D 7/14 428/418 |
| 4,814,017 A * | 3/1989 | Yoldas | ................ | C09D 183/04 106/287.12 |
| 5,028,489 A * | 7/1991 | Kissel | .................... | C08J 3/215 428/469 |
| 6,177,488 B1 * | 1/2001 | Kasari | ..................... | B05D 1/36 523/402 |
| 6,419,989 B1 * | 7/2002 | Betz | ....................... | B05D 7/574 427/385.5 |
| 6,475,300 B2 * | 11/2002 | Shimakura | ............... | C09D 4/00 106/14.41 |
| 6,605,365 B1 * | 8/2003 | Krienke | ................... | B05D 3/102 428/328 |
| 6,872,765 B1 | 3/2005 | Betz et al. | | |
| 8,147,918 B2 * | 4/2012 | Standke | .................. | C09D 4/00 106/38.2 |
| 9,359,507 B2 * | 6/2016 | Kramer | .................... | C09D 5/08 |
| 2004/0002566 A1 * | 1/2004 | Gash | .................... | B01J 13/0056 524/431 |
| 2004/0022950 A1 * | 2/2004 | Jung | ...................... | C09D 5/002 427/385.5 |
| 2005/0090635 A1 * | 4/2005 | Hommmes | ............ | C08G 77/26 528/31 |
| 2005/0147832 A1 * | 7/2005 | Okai | .................. | C08G 59/4035 428/447 |
| 2006/0251837 A1 * | 11/2006 | Cnossen | .................. | C09D 1/00 428/35.7 |

(Continued)

FOREIGN PATENT DOCUMENTS

| CN | 101184866 A | 5/2008 |
|---|---|---|
| CN | 101663555 A | 3/2010 |

(Continued)

OTHER PUBLICATIONS

Wang et al. "Sol-gel coatings on metals for corrosion protection" Progress in Organic Coatings 2009, 64, 327-338. (Year: 2009).*
Wouters et al. "Transparent UV curable antistatic hybrid coatings on polycarbonate prepared by the sol-gel method" Progress in Organic Coatings 2004, 51, 312-320. (Year: 2004).*
Fedel et al. Compatibility between cataphoretic electro-coating and silane surface layer for the corrosion protection of galvanized steer Progress in Organic Coatings 2010, 69, 118-125. (Year: 2010).*

(Continued)

*Primary Examiner* — Robert S Loewe
(74) *Attorney, Agent, or Firm* — Oblon, McClelland, Maier & Neustadt, L.L.P.

(57) ABSTRACT

The present invention relates to an aqueous coating composition comprising at least one aqueous dispersion or solution (A) of at least one electrophoretically depositable binder and optionally of at least one crosslinking agent, and also at least one aqueous sol-gel composition (B), for at least partly coating an electrically conductive substrate with an electrocoat material, where the aqueous sol-gel composition (B) is obtainable by reaction of at least one starting compound suitable for preparing the sol-gel composition (B) with water, with hydrolysis and condensation of the at least one starting compound, to a method for producing the coating composition, to the use thereof for at least partly coating an electrically conductive substrate with an electrocoat material, to a method for at least partly coating an electrically conductive substrate with an electrocoat material by at least partial electrophoretic deposition of the coating composition on the substrate surface, to an electrically conductive substrate at least partially coated therewith, and to an article or component produced from at least one such substrate.

10 Claims, No Drawings

(56) References Cited

U.S. PATENT DOCUMENTS

| | | | |
|---|---|---|---|
| 2007/0282122 A1* | 12/2007 | Holland | C07F 7/1836 556/466 |
| 2008/0017071 A1* | 1/2008 | Moebus | C09D 7/68 106/287.24 |
| 2008/0248211 A1 | 10/2008 | Gonzalez et al. | |
| 2009/0148711 A1* | 6/2009 | Le Blanc | C08G 77/58 428/447 |
| 2009/0152115 A1 | 6/2009 | Zaban et al. | |
| 2010/0129645 A1 | 5/2010 | Gensler et al. | |
| 2010/0288963 A1* | 11/2010 | Mitina | B82Y 30/00 252/8.62 |
| 2014/0197039 A1 | 7/2014 | Inbe et al. | |

FOREIGN PATENT DOCUMENTS

| | | |
|---|---|---|
| CN | 102212863 A | 10/2011 |
| DE | 35 18 732 A1 | 11/1986 |
| DE | 35 18 770 A1 | 11/1986 |
| DE | 199 09 877 A1 | 9/2000 |
| DE | 199 09 894 A1 | 9/2000 |
| DE | 10 2007 015450 A1 | 10/2008 |
| EP | 0 004 090 A2 | 9/1979 |
| EP | 0 012 463 A1 | 6/1980 |
| EP | 0 505 445 | 9/1992 |
| EP | 0 961 797 | 12/1999 |
| EP | 1 510 558 A1 | 3/2005 |
| EP | 1 990 379 A2 | 11/2008 |
| GB | 2 425 975 A | 11/2006 |
| JP | 2000-336288 A | 12/2000 |
| JP | 2001-19897 A | 1/2001 |
| JP | 2002-538283 A | 11/2002 |
| JP | 2011-89042 A | 5/2011 |
| JP | 2012-132053 A | 7/2012 |
| JP | 2013-56960 A | 3/2013 |
| JP | 2013-56961 A | 3/2013 |
| JP | 2013-67785 A | 4/2013 |
| JP | 2013-256560 A | 12/2013 |
| WO | 01/21718 A1 | 3/2001 |
| WO | WO 2006/120390 A2 | 11/2006 |
| WO | 2007/015249 A2 | 2/2007 |
| WO | 2008/025122 A1 | 3/2008 |
| WO | 2009/115504 A1 | 9/2009 |
| WO | 2010/088250 A1 | 8/2010 |
| WO | 2012/009351 A1 | 1/2012 |

OTHER PUBLICATIONS

Wu et al. "Improved corrosion performance of electrophoretic coatings by silane addition" Corrosion Science 2012, 56, 58-66. (Year : 2012).*

Combined Chinese Office Action and Search Report dated Feb. 27, 2017 in Patent Application No. 201380078723.7 (with English language translation and English Translation of Categories of Cited Documents).

W. X. Chen, et al., 'Coating and Detection Technology° Chemical Industry Press, 2011, 3 pages.

Office Action dated May 23, 2017 in Japanese Patent Application No. 2016-533824 (with English translation).

International Search Report dated Mar. 17, 2014 in PCT/EP13/66830 Filed Aug. 12, 2013.

* cited by examiner

DIP-COATING COMPOSITION FOR ELECTROCONDUCTIVE SUBSTRATES, COMPRISING A SOL-GEL COMPOSITION

The present invention relates to an aqueous coating composition comprising at least one aqueous dispersion or solution (A) of at least one electrophoretically depositable binder and optionally of at least one crosslinking agent, and also at least one aqueous sol-gel composition (B), for at least partly coating an electrically conductive substrate with an electrocoat material, where the aqueous sol-gel composition (B) is obtainable by reaction of at least one starting compound suitable for preparing the sol-gel composition (B) with water, with hydrolysis and condensation of the at least one starting compound, to a method for producing the coating composition, to the use thereof for at least partly coating an electrically conductive substrate with an electrocoat material, to a method for at least partly coating an electrically conductive substrate with an electrocoat material by at least partial electrophoretic deposition of the coating composition on the substrate surface, to an electrically conductive substrate at least partially coated therewith, and to an article or component produced from at least one such substrate.

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose.

A disadvantage of the known coating methods, particularly affecting the known methods employed within the automobile industry, is that these methods normally envisage a phosphatizing pretreatment step, in which the substrate for coating, after an optional cleaning step and before a dip coating step, is treated with a metal phosphate such as zinc phosphate in a phosphatizing step, in order to ensure adequate corrosion prevention. This pretreatment normally entails the implementation of a plurality of method steps in a plurality of different dipping tanks with different heating. During the implementation of such pretreatment, moreover, waste sludges are produced, which burden the environment and have to be disposed of. On environmental and economic grounds, therefore, it is especially desirable to be able to forgo such a pretreatment step, but nevertheless to achieve at least the same corrosion prevention effect as achieved using the known methods.

US 2008/0248211 A1 discloses the use, in coating compositions for producing electrocoat systems, of prepolymers which carry silane groups such as alkoxysilane groups. These silane groups may contribute to the curing of the binder, but on account of their incorporation to the polymer system are not capable of forming a sol-gel system in aqueous solution. A disadvantage of using such coating compositions is that there may be unwanted crosslinking between different alkoxysilane groups and/or silane groups formed from them, with one another. Moreover, shielding effects due to the polymer system may result in there being little or no possibility for slow hydrolysis of the alkoxysilane groups to give reactive silanol groups.

The use of silane compounds such as alkoxysilanes as an additive component in coating compositions for producing electrocoat systems is known from, for example, EP 1 990 379 A2, WO 2010/088250 A1, WO 2012/009351 A1, and WO 2001/021718 A1. These silane compounds are added to the coating compositions only in a molecular form, and not in the form of a sol-gel composition. A disadvantage of using such silane compounds in molecular form in coating compositions, however, is that they may have too high a reactivity and there may therefore be unwanted side-reactions with reactive functional groups of the binder, such as hydroxyl groups, or pigments optionally present on the surface. Moreover, because of the silane compounds in molecular form that they contain, such coating compositions typically have inadequate stability, such as inadequate storage stability, and/or are subject to restrictions in terms of the maximum quantities of silane compounds that can be incorporated into these compositions.

EP 1 510 558 A1 discloses an aftertreatment of substrates that have been provided with a dipping varnish, by rinsing them with an aqueous composition comprising colloidal oxides or colloidal hydroxides of a metal of atomic number 20 to 83. Using such colloidal metal oxides and metal hydroxides, however, it is not possible to develop film formation and, moreover, to develop covalent bonds with binder and optionally crosslinking agent present in the dipping varnish. The use of sol-gel compositions, particularly as part of the dip-coating film, is not described in EP 1 510 558 A1.

A need exists for electrophoretically depositable coating compositions for at least partly coating electrically conductive substrates with an electrocoat material, these compositions permitting more economic and more environmental coating methods than conventional coating compositions employed, but nevertheless being at least equally suitable for achieving the requisite corrosion prevention effect.

It is an object of the present invention, therefore, to provide a coating composition for at least partly coating an electrically conductive substrate, that has advantages over the coating compositions known from the prior art. More particularly it is an object of the present invention to provide coating compositions which permit a more economic and more environmental coating method than do conventional coating compositions employed. In particular, moreover, it is an object of the present invention to provide coating compositions which make it possible to forgo the phosphatizing operation that normally needs to be carried out using a metal phosphate prior to dip coating, but with which, nevertheless, it is possible to achieve at least the same corrosion prevention effect which can also be achieved with the coating compositions commonly employed.

This object is achieved by the subject matter claimed in the claims and also by the preferred embodiments of that subject matter that are described in the description hereinafter.

A first subject of the present invention is therefore an aqueous coating composition comprising
 (A) at least one aqueous dispersion or solution, preferably at least one aqueous electrophoretically depositable binder and optionally of at least one crosslinking agent, and
 (B) at least one aqueous sol-gel composition,
 for at least partly coating an electrically conductive substrate with an electrocoat material,
 the aqueous sol-gel composition (B) being obtainable by reaction of at least one starting compound suitable for preparing the sol-gel composition (B) with water, with hydrolysis and condensation of the at least one starting compound.

The aqueous coating composition of the invention therefore serves for producing an electrocoat on a substrate surface of an electrically conductive substrate.

It has surprisingly been found that the aqueous coating composition of the invention makes it possible to be able to forgo the step normally needing to be carried out prior to dip-coating, more particularly electrocoating, namely the step of pretreating the electrically conductive substrate for at least partial coating with a metal phosphate such as zinc phosphate in order to form a metal phosphate layer on the substrate, thereby allowing the coating method in question to be made overall not only more economical, more particularly less time-consuming and cost-intensive, but also more environmental than conventional methods.

In particular it has surprisingly been found that electrically conductive substrates coated at least partially with the aqueous coating composition of the invention, particularly on account of the presence of component (B) in the aqueous coating composition of the invention, have at least no disadvantages and, in particular, have advantages in terms of their corrosion prevention effect, by comparison with substrates coated with conventional coating compositions that have no component (B): accordingly, the coated substrates produced with the aqueous coating composition of the invention, particularly coated galvanized steels and aluminum, are notable relative to corresponding comparative examples in particular for the fact that the corrosive undermining and the surface rust, as a measure of corrosion prevention effect, are significantly reduced.

Moreover, it has surprisingly been found that the aqueous coating composition of the invention for at least partly coating an electrically conductive substrate with an electrocoat material—in spite of the component (B) therein—has good storage stability, in particular because of a stabilization of component (B) in the presence of component (A).

In one preferred embodiment, the term "comprising" in the sense of the present invention, as for example in connection with the aqueous coating composition of the invention, has the meaning of "consisting of". With regard to the coating composition of the invention in this preferred embodiment, one or more of the further components identified below and optionally present in the coating composition used in accordance with the invention may be present in the coating composition, such as—besides components (A) and (B)—for example, the optional components (C) and/or (D) and/or (E), and also organic solvents optionally present. All of these components may each be present in their preferred embodiments, as identified above and below, in the coating composition of the invention.

Coating Composition

The aqueous coating composition of the invention is suitable for at least partly coating an electrically conductive substrate with an electrocoat material, meaning that it is apt to be applied at least partly in the form of an electrocoat to the substrate surface of an electrically conductive substrate. Preferably the entire aqueous coating composition of the invention is depositable electrophoretically more preferably cathodically.

The aqueous coating compositions of the invention comprise water as liquid diluent.

The term "aqueous" in connection with the coating composition of the invention refers preferably to liquid coating compositions which comprise water as the main component of their liquid diluent, i.e., as liquid solvent and/or dispersion medium. Optionally, however, the coating compositions of the invention may include at least one organic solvent in minor fractions. Examples of such organic solvents include heterocyclic, aliphatic or aromatic hydrocarbons, mono- or polyhydric alcohols, especially methanol and/or ethanol, ethers, esters, ketones, and amides, such as, for example, N-methylpyrrolidone, N-ethylpyrrolidone, dimethyl-formamide, toluene, xylene, butanol, ethyl glycol and butyl glycol and also their acetates, butyl diglycol, diethylene glycol dimethyl ether, cyclohexanone, methyl ethyl ketone, methylisobutyl ketone, acetone, isophorone, or mixtures thereof. The fraction of these organic solvents is preferably not more than 20.0 wt %, more preferably not more than 15.0 wt %, very preferably not more than 10.0 wt %, more particularly not more than 5.0 wt % or not more than 4.0 wt % or not more than 3.0 wt %, more preferably still not more than 2.5 wt % or not more than 2.0 wt % or not more than 1.5 wt %, most preferably not more than 1.0 wt % or not more than 0.5 wt %, based in each case on the total fraction of the liquid diluents—i.e., liquid solvents and/or dispersion media—that are present in the coating composition of the invention.

The fractions in % by weight of all components included in the coating composition of the invention, in other words the fractions of (A), (B), and water, and also optionally of (C) and/or (D) and/or (E) add up preferably to 100 wt %, based on the total weight of the coating composition.

The aqueous coating composition of the invention preferably has a solids fraction in the range from 5 to 45 wt %, more preferably in the range from 7.5 to 35 wt %, very preferably from 10 to 30 wt %, more preferably still in the range from 12.5 to 25 wt % or in the range from 15 to 25 wt %, more particularly from 17 to 22 wt %, based in each case on the total weight of the aqueous coating composition of the invention. Methods for determining the solids fraction are known to the skilled person. The solids fraction is determined preferably according to DIN EN ISO 3251.

Substrate

Suitable electrically conductive substrates used in accordance with the invention are all of the electrically conductive substrates known to the skilled person that are customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminumized steel, aluminum, and magnesium; particularly suitable are galvanized steel and aluminum. Suitable as substrates, moreover, are hot-rolled steel, high-strength steel, Zn/Mg alloys, and Zn/Ni alloys. Particularly suitable substrates are parts of bodies or complete bodies of automobiles for production. Before the electrically conductive substrate in question is used, the substrate is preferably cleaned and/or degreased.

The electrically conductive substrate used in accordance with the invention may be a substrate pretreated with at least one metal phosphate. Such pretreatment by phosphatizing, which normally takes place after the substrate has been cleaned and before it is dip-coated, is, in particular, a pretreatment step customary within the automobile industry. In this context it is especially desirable for a pretreatment, carried out optionally, to be designed advantageously from environmental and/or economic aspects. Therefore, for example, an optional pretreatment step is possible in which instead of a customary trication phosphatizing, the nickel component is omitted and instead a dication phosphatizing (comprising zinc and manganese cations and no nickel cations) is carried out on the electrically conductive substrate used in accordance with the invention, prior to coating with the aqueous coating composition of the invention.

A specific object of the present invention, however, is that it is possible to forgo such pretreatment of the electrically conductive substrate for at least partial coating, by phosphatizing with a metal phosphate such as zinc phosphate, for example. In one preferred embodiment, therefore, the electrically conductive substrate used in accordance with the invention is not such a phosphatized substrate.

Prior to being coated with the aqueous coating composition of the invention, the electrically conductive substrate used in accordance with the invention may be pretreated with an aqueous pretreatment composition which comprises at least one water-soluble compound containing at least one Ti atom and/or at least one Zr atom and which comprises at least one water-soluble compound as a source of fluoride ions, containing at least one fluorine atom, or with an aqueous pretreatment composition which comprises a water-soluble compound obtainable by reaction of at least one water-soluble compound containing at least one Ti atom and/or at least one Zr atom with at least one water-soluble compound as a source of fluoride ions, containing at least one fluorine atom.

The at least one Ti atom and/or the at least one Zr atom in this case preferably have the +4 oxidation state. By virtue of the components it contains and preferably by virtue, moreover, of the appropriately selected proportions of these components, the aqueous pretreatment composition preferably comprises a fluoro complex, such as a hexafluorometallate, i.e., in particular, hexafluorotitanate and/or at least one hexafluorozirconate. The pretreatment composition preferably has a total concentration of the elements Ti and/or Zr which is not below $2.5 \cdot 10^{-4}$ mol/L but is not greater than $2.0 \cdot 10^{-2}$ mol/L. The preparation of such pretreatment compositions and their use in the pretreatment of electrically conductive substrates are known from WO 2009/115504 A1, for example.

The pretreatment composition preferably further comprises copper ions, preferably copper(II) ions, and also, optionally, one or more water-soluble and/or water-dispersible compounds comprising at least one metal ion selected from the group consisting of Ca, Mg, Al, B, Zn, Mn and W, and also mixtures thereof, preferably at least one aluminosilicate, and more particularly one having an atomic ratio of Al to Si atoms of at least 1:3. The preparation of such pretreatment compositions and their use in the pretreatment of electrically conductive substrates are known from WO 2009/115504 A1, for example. The aluminosilicates are present preferably in the form of nanoparticles having a particle size in the range from to 100 nm as determinable by dynamic light scattering. The particle size for such nanoparticles, in the range from 1 to 100 nm, as determinable by dynamic light scattering, is determined in accordance with DIN ISO 13321.

Component (A) and Also Optional Components (C) and (D) and Also (E)

The aqueous coating composition of the invention comprises as component (A) at least one aqueous dispersion or solution (A), preferably at least one aqueous dispersion, of at least one electrophoretically depositable binder and optionally of at least one crosslinking agent.

The term "binder" as part of the aqueous dispersion or solution (A) encompasses for the purposes of the present invention, preferably, electrophoretically depositable polymeric resins, those responsible for film-forming, of the aqueous coating composition of the invention, although any crosslinking agent present is not included in the concept of the binder. A "binder" in the sense of the present invention is therefore a polymeric resin, although any crosslinking agent present is not included in the concept of the binder. In particular, moreover, any pigments or fillers present are not subsumed within the concept of the binder. The term "binder", in the sense of the present invention, does not, moreover, include component (B) of the aqueous coating composition of the invention, in other words the aqueous sol-gel composition (B).

The inventively employed aqueous dispersion or solution (A) of at least one electrophoretically depositable binder and optionally of at least one crosslinking agent preferably has a nonvolatile fraction, i.e., a solids fraction, in a range from 25 to 60 wt %, more preferably in a range from 27.5 to 55 wt %, very preferably in a range from 30 to 50 wt %, more preferably still in a range from 32.5 to 45 wt %, more particularly in a range from 35 to 42.5 wt %, based in each case on the total weight of the aqueous dispersion or solution (A).

The inventively employed aqueous dispersion or solution (A) of at least one electrophoretically dispositable binder and optionally of at least one crosslinking agent preferably has a nonvolatile fraction, i.e., a solids fraction, in a range from 8 to 30 wt %, more preferably in a range from 9 to 28 wt %, very preferably in a range from 10 to 26 wt %, more preferably still in a range from 11 to 24 wt %, more particularly in a range from 12 to 22 wt % or in a range from 13 to 20 wt %, based in each case on the total weight of the aqueous coating composition of the invention.

Methods for determining the solids fraction are known to the skilled person. The solids fraction is determined preferably according to DIN EN ISO 3251.

The at least one electrophoretically depositable binder is preferably a cathodically depositable binder or an anodically depositable binder. The skilled person knows of such binders. Very preferably the binder is a cathodically depositable binder. The inventively employed binder is a binder dispersible or soluble in water.

All customary electrophoretically depositable binders known to the skilled person are suitable here as binder component of the aqueous dispersion or solution (A) of the aqueous coating composition of the invention.

The inventively employed aqueous dispersion or solution (A) preferably comprises at least one binder which has reactive functional groups which permit a crosslinking reaction. The binder here is a self-crosslinking or externally crosslinking binder, preferably an externally crosslinking binder. In order to permit a crosslinking reaction, the inventively employed aqueous dispersion or solution (A) therefore preferably further includes at least one crosslinking agent as well as the at least one binder.

The binder present in the inventively employed aqueous dispersion or solution (A), or the crosslinking agent optionally present, is preferably thermally crosslinkable. The binder and the crosslinking agent optionally present are preferably crosslinkable on heating to temperatures above room temperature, i.e., above 18-23° C. The binder and the crosslinking agent optionally present are preferably crosslinkable only at oven temperatures 80° C., more preferably 110° C., very preferably 130° C., and especially preferably 140° C. With particular advantage the binder and the crosslinking agent optionally present are crosslinkable at 100 to 250° C., more preferably at 125 to 250° C., and very preferably at 150 to 250° C.

The inventively employed aqueous dispersion or solution (A) preferably comprises at least one binder which has reactive functional groups which permit a crosslinking reaction preferably in combination with at least one crosslinking agent.

Any customary crosslinkable reactive functional group known to the skilled person is contemplated here. The binder preferably has reactive functional groups selected from the group consisting of optionally substituted primary amino groups, optionally substituted secondary amino groups, optionally substituted tertiary amino groups, hydroxyl groups, thiol groups, carboxyl groups, groups which have at least one C=C double bond, such as vinyl groups or (meth)acrylate groups, for example, and epoxide groups, it being possible for the primary, secondary and tertiary amino groups to be substituted by one or more, such as for example 2 or 3 substituents in each case independently of one another selected from the group consisting of $C_{1-6}$ aliphatic radicals such as methyl, ethyl, n-propyl or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl)$_2$. Particularly preferred is at least one binder which has reactive functional groups selected from the group consisting of optionally substituted primary amino groups, optionally substituted secondary amino groups, optionally substituted tertiary amino groups, and hydroxyl groups, it being possible for the primary, secondary and tertiary amino groups to be substituted optionally by one or more, such as for example 2 or 3 substituents in each case independently of one another selected from the group consisting of $C_{1-6}$ aliphatic radicals such as methyl, ethyl, n-propyl, or isopropyl, for example, and it being possible for these $C_{1-6}$ aliphatic radicals in turn to be substituted optionally by 1, 2 or 3 substituents in each case independently of one another selected from the group consisting of OH, $NH_2$, $NH(C_{1-6}$ alkyl), and $N(C_{1-6}$ alkyl)$_2$.

The binder present in the inventively employed aqueous dispersion or solution (A) is preferably at least one epoxide-based polymeric resin, more particularly at least one cationic epoxide-based and amine-modified resin. The preparation of cationic, amine-modified, epoxide-based resins of this kind is known and is described in, for example, DE 35 18 732, DE 35 18 770, EP 0 004 090, EP 0 012 463, EP 0 961 797 B1, and EP 0 505 445 B1. Cationic epoxide-based amine-modified resins are understood preferably to be reaction products of at least one optionally modified polyepoxide, i.e., of at least one optionally modified compound having two or more epoxide groups, with at least one preferably water-soluble amine, preferably with at least one such primary and/or secondary amine. Particularly preferred polyepoxides are polyglycidyl ethers of polyphenols and are prepared from polyphenols and epihalohydrins. Polyphenols that may be used include, in particular, bisphenol A and/or bisphenol F. Other suitable polyepoxides are polyglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol, and 2,2-bis(4-hydroxycyclohexyl)propane. Modified polyepoxides are those polyepoxides in which some of the reactive functional groups have undergone reaction with at least one modifying compound. Examples of such modifying compounds are as follows:

a) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines having secondary amino groups, e.g., N,N'-dialkyl-alkylenediamines, such as dimethylethylenediamine, N,N'-dialkyl-polyoxyalkyleneamines, such as N,N'-dimethylpolyoxypropylenediamine, cyanalkylated alkylenediamines, such as bis-N,N'-cyanethyl-ethylenediamine, cyanalkylated polyoxyalkyleneamines, such as bis-N,N'-cyanethylpolyoxypropylenediamine, polyaminoamides, such as Versamides, for example, especially amino-terminated reaction products of diamines (e.g., hexamethylenediamine), polycarboxylic acids, especially dimer fatty acids, and monocarboxylic acids, especially fatty acids, or the reaction product of one mole of diaminohexane with two moles of monoglycidyl ether, or monoglycidyl esters, especially glycidyl esters of α-branched fatty acids, such as of Versatic acid, or c) compounds containing hydroxyl groups, such as neopentyl glycol, bisethoxylated neopentyl glycol, neopentyl glycol hydroxypivalate, dimethylhydantoin-N—N'-diethanol, hexane-1,6-diol, hexane-2,5-diol, 1,4-bis(hydroxymethyl)cyclohexane, 1,1-isopropylidenebis(p-phenoxy)-2-propanol, trimethylolpropane, pentaerythritol, or amino alcohols, such as triethanolamine, methyldiethanolamine, or hydroxyl-containing alkylketimines, such as aminomethylpropane-1,3-diol methyl isobutylketimine or tris(hydroxymethyl)aminomethane cyclohexanone ketimine, and also polyglycol ethers, polyester polyols, polyether polyols, polycaprolactone polyols, polycaprolactam polyols of various functionalities and molecular weights, or d) saturated or unsaturated fatty acid methylesters, which are transesterified in the presence of sodium methoxide with hydroxyl groups of the epoxy resins.

Examples of amines which can be used are mono- and dialkylamines, such as methylamine, ethylamine, propyl amine, butylamine, dimethyl amine, diethylamine, dipropylamine, methylbutylamine, alkanolamines, such as methylethanolamine or diethanolamine, for example, and dialkylaminoalkylamines, such as dimethylaminoethylamine, diethylaminopropylamine, or dimethylaminopropylamine, for example. The amines that can be used may also contain other functional groups as well, provided these groups do not disrupt the reaction of the amine with the epoxide group of the optionally modified polyepoxide and also do not lead to gelling of the reaction mixture. Secondary amines are preferably used. The charges which are needed for dilutability with water and for electrical deposition may be generated by protonation with water-soluble acids (e.g., boric acid, formic acid, acetic acid, lactic acid, preferably acetic acid). A further possibility for introducing cationic groups into the optionally modified polyepoxide lies in the reaction of epoxide groups in the polyepoxide with amine salts.

Besides the at least one electrophoretically depositable binder, the inventively employed aqueous dispersion or solution (A) preferably comprises at least one crosslinking agent which permits a crosslinking reaction with the reactive functional groups of the binder.

All customary crosslinking agents known to the skilled person may be used, such as phenolic resins, polyfunctional Mannich bases, melamine resins, benzoguanamine resins, epoxides, free polyisocyanates and/or blocked polyisocyanates, for example, particularly blocked polyisocyanates.

A particularly preferred crosslinking agent is a blocked polyisocyanate. Blocked polyisocyanates which can be utilized are any polyisocyanates such as diisocyanates, for example, in which the isocyanate groups have been reacted with a compound and so the blocked polyisocyanate formed is stable in particular with respect to hydroxyl and amino groups, such as primary and/or secondary amino groups, at room temperature, i.e., at a temperature of 18 to 23° C., but reacts at elevated temperatures, as for example at ≥80° C., more preferably ≥110° C., very preferably ≥130° C., and especially preferably ≥140° C., or at 90° C. to 300° C. or at 100 to 250° C., more preferably at 125 to 250° C., and very preferably at 150 to 250° C.

In the preparation of the blocked polyisocyanates it is possible to use any desired organic polyisocyanates that are suitable for crosslinking. Isocyanates used are preferably (hetero) aliphatic, (hetero)cycloaliphatic, (hetero) aromatic, or (hetero)aliphatic-(hetero)aromatic isocyanates. Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-1,4-methanonaphthalen-2 (or 3),5-ylenedimethylene diisocyanate, hexahydro-4,7-methano-indan-1 (or 2),5 (or 6)-ylenedimethylene diisocyanate, hexahydro-4,7-methanoindan-1 (or 2),5 (or 6)-ylene diisocyanate, 2,4- and/or 2,6-hexahydrotolylene diisocyanate (H6-TDI), 2,4- and/or 2,6-tolylene diisocyanate (TDI), perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate. Furthermore, mixtures of polyisocyanates may also be utilized. The organic polyisocyanates contemplated as crosslinking agents for the invention may also be prepolymers, deriving, for example, from a polyol, including from a polyether polyol or a polyester polyol. Especially preferred are 2,4-toluene diisocyanate and/or 2,6-toluene diisocyanate (TDI), and/or isomer mixtures of 2,4-toluene diisocyanate and 2,6-toluene diisocyanate, and/or diphenylmethane diisocyanate (MDI).

Used preferably for the blocking of polyisocyanates may be any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols such as cyclopentanol and cyclohexanol; aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The relative weight ratio of the at least one binder to the at least one crosslinking agent in the inventively employed aqueous dispersion or solution (A) is preferably in a range from 4:1 to 1.1:1, more preferably in a range from 3:1 to 1.1:1, very preferably in a range from 2.5:1 to 1.1:1, more particularly in a range from 2.1:1 to 1.1:1, based in each case on the solids fraction of the at least one binder and of the at least one crosslinking agent in the aqueous dispersion or solution (A) of the inventive coating composition.

In another preferred embodiment, the relative weight ratio of the at least one binder to the at least one crosslinking agent in the inventively employed aqueous dispersion or solution (A) is in a range from 4:1 to 1.5:1, more preferably in a range from 3:1 to 1.5:1, very preferably in a range from 2.5:1 to 1.5:1, more particularly in a range from 2.1:1 to 1.5:1, based in each case on the solids fraction of the at least one binder and of the at least one crosslinking agent in the aqueous dispersion or solution (A) of the inventive coating composition.

Depending on desired application, moreover, the aqueous coating composition of the invention may comprise at least one pigment (C).

A pigment (C) of this kind, present in the aqueous coating composition inventively employed is preferably selected from the group consisting of organic and inorganic, color-imparting and extending pigments.

This at least one pigment (C) may be present as part of the aqueous solution or dispersion (A).

The at least one pigment (C) may alternatively be incorporated into the coating composition inventively employed in the form of a further aqueous dispersion or solution, different from (A). In this embodiment, the corresponding pigment-containing aqueous dispersion or solution may further comprise at least one binder.

Examples of suitable inorganic color-imparting pigments (C) are white pigments such as zinc oxide, zinc sulfide, titanium dioxide, antimony oxide, or lithopone; black pigments such as carbon black, iron manganese black, or spinel black; chromatic pigments such as cobalt green or ultramarine green, cobalt blue, ultramarine blue or manganese blue, ultramarine violet or cobalt violet and manganese violet, red iron oxide, molybdate red, or ultramarine red; brown iron oxide, mixed brown, spinel phases and corundum phases; or yellow iron oxide, nickel titanium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers".

The pigment content of the aqueous coating compositions inventively employed may vary according to intended use and according to the nature of the pigments (C). The amount, based in each case on the total weight of the aqueous coating composition inventively employed, is preferably in the range from 0.1 to 30 wt % or in the range from 0.5 to 20 wt %, more preferably in the range from 1.0 to 15 wt %, very preferably in the range from 1.5 to 10 wt %, and more particularly in the range from 2.0 to 5.0 wt %, or in the range from 2.0 to 4.0 wt %, or in the range from 2.0 to 3.5 wt %.

Depending on desired application, the aqueous coating composition inventively employed may comprise one or more typically employed additives (D). These additives (D) are preferably selected from the group consisting of wetting agents, emulsifiers, dispersants, surface-active compounds such as surfactants, flow control assistants, solubilizers, defoamers, rheological assistants, antioxidants, stabilizers, preferably heat light stabilizers, catalysts, fillers, waxes, flexibilizers, plasticizers, and mixtures of the abovementioned additives. The additive content may vary very widely according to intended use. The amount, based on the total weight of the aqueous coating composition inventively employed is preferably 0.1 to 20.0 wt %, more preferably 0.1 to 15.0 wt %, very preferably 0.1 to 10.0 wt %, especially preferably 0.1 to 5.0 wt %, and more particularly 0.1 to 2.5 wt %.

The at least one additive (D) here may be present as part of the aqueous solution or dispersion (A). Alternatively the at least one additive (D) may also be incorporated into the coating composition inventively employed, in the form of a further aqueous dispersion or solution different from (A), as for example within an aqueous dispersion or solution which comprises at least one pigment (D) and optionally, moreover, at least one binder.

The aqueous coating composition of the invention may preferably further comprise at least one component (E). The optionally present component (E) is at least one metal ion-containing compound and/or at least one metal atom-containing compound suitable for releasing metal ions, the metal ions being ions of metal atoms selected from the group consisting of Zr, Ti, Co, V, W, Mo, Cu, Zn, In, Bi, Y, and lanthanides, more preferably Bi, and the metal ions being present in the coating composition in a concentration in the range from 30 to 20 000 ppm, based on the total weight of the coating composition in wt %. With particular preference the component (E) is at least one compound containing bismuth ions and/or at least one compound containing bismuth atoms and suitable for releasing bismuth ions, the bismuth ions being present in the coating composition in a concentration in the region of at least 200 ppm, preferably at least 500 ppm, more preferably 1000 ppm, but in each case not more than 20 000 ppm, preferably in each case not more than 10 000 ppm, and more particularly in each case not more than 5000 ppm, based in each case on the total weight of the coating composition in wt %.

This at least one component (E) may be present as part of the aqueous solution or dispersion (A). Alternatively the at least one component (E) may also be incorporated, in the form of a further aqueous dispersion or solution, different from (A), into the coating composition of the invention, as for example within an aqueous dispersion or solution which comprises at least one pigment (D) and optionally, furthermore, at least one binder.

Component (B)

The aqueous coating composition of the invention comprises at least one aqueous sol-gel composition (B) which is obtainable by reaction of at least one starting compound suitable for preparing the sol-gel composition (B) with water, with hydrolysis and condensation of the at least one starting compound.

The aqueous sol-gel composition (B) employed inventively for preparing the coating composition of the invention takes the preferable form of an aqueous colloidal solution or aqueous dispersion, more particularly the form of an aqueous colloidal solution.

The aqueous sol-gel composition (B) used for preparing the coating composition of the invention has preferably a pH in the range from 2.0 to 10.0, more preferably of in the range from 2.5 to 8.5 or in the range from 2.5 to 8.0, very preferably of in the range from 3.0 to 7.0 or in the range from 3.0 to 6.5 or in the range from 3.0 to 6.0, more particularly in the range from 3.5 to 6.0 or in the range from 3.5 to 5.5, especially preferably in the range from 3.7 to 5.5, most preferably in the range from 3.9 to 5.5 or 4.0 to 5.5. Techniques for setting pH levels in aqueous compositions are known to the skilled person. The setting of the desired pH is accomplished preferably by addition of at least one acid, more preferably of at least one inorganic and/or at least one organic acid. Examples of suitable inorganic acids include hydrochloric acid, sulfuric acid, phosphoric acid and/or nitric acid. An example of a suitable organic acid is propionic acid, lactic acid, acetic acid and/or formic acid. With very particular preference, the setting of the desired pH is accomplished by addition of formic acid.

The skilled person is aware of the terms "sol-gel composition", "sol-gel", and also the preparation of sol-gel compositions and sol-gels, from D. Wang et al., Progress in Organic Coatings 2009, 64, 327-338 or S. Zheng et al., J. Sol-Gel. Sci. Technol. 2010, 54, 174-187, for example.

An aqueous "sol-gel composition" in the sense of the present invention means preferably an aqueous composition prepared by reacting—with hydrolysis and condensation—at least one starting compound, which has at least one metal atom and/or semimetal atom such as $M^1$ and/or $M^2$, for example, and has at least two hydrolyzable groups such as two hydrolyzable groups $X^1$, for example, and which additionally optionally has at least one nonhydrolyzable organic radical such as $R^1$, for example, with water. The at least two hydrolyzable groups here are preferably each bonded directly to the at least one metal atom and/or at least one semimetal atom present in the at least one starting compound, in each case by means of a single bond. Because of the presence of the non-hydrolyzable organic radical such as $R^1$, for example, an inventively employed sol-gel composition of this kind may also be referred to as a "hybrid sol-gel composition".

In the course of this reaction, in a first hydrolysis step, the at least two hydrolyzable groups are eliminated and are replaced within the at least one starting compound by OH groups, thus resulting in the formation of metal-OH bonds or semimetal-OH bonds within the at least one starting compound used in the first step (hydrolysis step). In a second step, there is a condensation of two molecules formed in the first step, by reaction, for example, of one of the metal-OH bonds thus formed in one molecule with one of the metal-OH bonds thus formed in the second molecule, with elimination of water (condensation step). The resulting molecule, having for example at least one metal-O-metal group (or metal-O-semimetal group or semimetal-O-semimetal group) and also a total of at least two hydrolyzable groups, can then be hydrolyzed again and can react analogously with further compounds obtainable in accordance with the first hydrolysis step, with the resulting compound formed analogously being then able to continue reacting correspondingly, leading to the formation of chains and, in particular, of two- or three-dimensional structures. This at least two-step process, comprising at least the first hydrolysis step and at least the second condensation step, is referred to as a sol-gel process or sol-gel technique. Depending on the degree of crosslinking as a result of the condensation, the product is a sol or a gel, and consequently the aqueous composition is referred to as a sol-gel composition. A pure sol composition here means preferably a composition in which the reaction products are present in colloidal solution. A sol composition is characterized by a lower viscosity than a gel composition. A pure gel composition means preferably a composition which is distinguished by a high viscosity and which has a gel structure. The transition from a sol composition to a gel composition is marked preferably by an abrupt increase in the viscosity. The inventively employed sol-gel composition (B) is preferably neither a pure sol composition nor a pure gel composition, but instead a sol-gel composition.

The at least one starting compound needed for preparing the aqueous sol-gel composition (B) used in accordance with the invention is here prepared preferably by stirred incorporation into water of, or addition of water to, the at least one starting compound. This takes place preferably at a temperature which is in the range from 15° C. to 40° C. or in the range from 15° C. to 37° C., more preferably in the range from 17° C. to 35° C., most preferably in the range from 18° C. to 30° C. or in the range from 18° C. to 25° C. To accelerate the preparation of the aqueous sol-gel composition (B) used in accordance with the invention, the preparation may optionally also take place at temperatures higher than 40° C., as for example at a temperature of up to 80° C., i.e., for example in a range from 15° C. to 80° C.

The aqueous sol-gel composition (B) thus obtained is preferably left to rest, before being used to prepare the aqueous coating composition of the invention, for a time in the range from 2 hours to 28 days, more preferably for a time in the range from 3 hours to 26 days, very preferably for a time in the range from 5 hours to 22 days or for a time in the range from 6 hours to 20 days, more preferably still for a time in the range from 7 hours to 18 days, more particularly for a time in the range from 8 hours to 16 days, at a temperature of 18-25° C., in order to ensure sufficient hydrolysis and condensation. In another preferred embodiment, the aqueous sol-gel composition (B) thus obtained is left to rest, before being used to prepare the aqueous coating composition of the invention, for a time of at least 4 hours, preferably at least 6 hours or of at least 8 hours or of at least 12 hours or of at least 16 hours or of at least 20 hours or of at least 24 hours, more preferably for a time of at least 2 days or at least 3 days or at least 4 days or at least 6 days or at least 8 days or at least 10 days or at least 12 days or at least 14 days, at a temperature of 18-25° C., in order to ensure sufficient hydrolysis and condensation.

The at least one starting compound used in preparing the aqueous sol-gel composition (B), and having at least one metal atom and/or semimetal atom such as $M^1$ and/or $M^2$, for example, and at least two hydrolyzable groups such as at least two hydrolyzable groups $X^1$, for example, preferably also has at least one nonhydrolyzable organic radical. This nonhydrolyzable organic radical, such as a corresponding radical $R^1$, for example, is preferably bonded directly to the metal atom and/or semimetal atom present in the at least one starting compound, such as $M^1$ and/or $M^2$, for example, by means of a single bond. In this case, during the at least two-step process comprising at least the first hydrolysis step and at least the second condensation step, chains are formed, and more particularly two- or three-dimensional structures are formed, which have both organic and inorganic groups. In this case, the resulting sol-gel composition may be referred to as an inorganic-organic hybrid sol-gel composition.

The at least one nonhydrolyzable organic radical, such as the radical $R^1$, for example, optionally comprises at least one reactive functional group which is preferably selected from the group consisting of primary amino groups, secondary amino groups, epoxide groups, thiol groups, isocyanate groups, phosphorus-containing groups such as phosphonate groups, silane groups, which may optionally in turn have at least one nonhydrolyzable organic radical which optionally has at least one reactive functional group, and groups which have an ethylenically unsaturated double bond, such as vinyl groups or (meth)acrylic groups, very preferably selected from the group consisting of primary amino groups, secondary amino groups, epoxide groups, thiol groups, and groups which have an ethylenically unsaturated double bond, such as vinyl groups or (meth)acrylic groups, more particularly selected from the group consisting of primary amino groups and epoxide groups. The epoxide group here may be converted by reaction with water into two hydroxyl groups, which are then able to act as reactive functional groups.

The expression "(meth)acrylic" in the sense of the present invention encompasses each of the definitions "methacrylic" and/or "acrylic".

The expression "nonhydrolyzable organic radical which has at least one reactive functional group" is preferably understood, in connection with a nonhydrolyzable organic radical such as the radical $R^1$, for example, to mean in the sense of the present invention that the nonhydrolyzable organic radical has at least one such functional group that exhibits reactivity toward the reactive functional groups optionally present in the binder (A) of the coating composition inventively employed and/or toward the reactive functional groups present in the crosslinking agent (C) optionally present in the coating composition inventively employed. Through a reaction of corresponding functional groups, covalent bonds may be formed here.

However, the at least one nonhydrolyzable organic radical, such as the radical $R^1$, for example, need not necessarily have at least one reactive functional group, but may instead be a nonhydrolyzable organic radical which has no reactive functional group.

The expression "nonhydrolyzable organic radical which has no reactive functional group" is understood preferably in the sense of the present invention, in connection with a nonhydrolyzable organic radical such as the radical $R^1$, for example, to mean that the non-hydrolyzable organic radical has no such functional group that exhibits reactivity toward the reactive functional groups present optionally in the binder (A) of the coating composition inventively employed and/or toward the reactive functional groups present in the crosslinking agent optionally present in the coating composition inventively employed.

A particular feature of a resulting aqueous sol-gel composition (B)—in which the at least one starting compound has not only the at least two hydrolyzable groups such as at least two hydrolyzable groups $X^1$, for example, but also at least one nonhydrolyzable organic radical such as $R^1$, for example—is that its preparation process does not give rise to the formation of a colloidal hydroxide or colloidal oxide, which is disclosed in EP 1 510 558 A1, for example, but instead gives rise to an organic-inorganic hybrid sol-gel composition, which can be incorporated more advantageously into the coating composition of the invention than can a colloidal hydroxide or colloidal oxide according to EP 1 510 558 A1.

The aqueous sol-gel composition (B) used in preparing the aqueous coating composition of the invention preferably has at least two different nonhydrolyzable organic radicals, such as, for example, at least two different nonhydrolyzable organic radicals $R^1$, where one of these radicals is a $C_{1-10}$ aliphatic radical which has at least one hydroxyl group as at least one reactive functional group, and the remaining nonhydrolyzable organic radical is a $C_{1-10}$ aliphatic radical which has at least one primary amino group or at least one secondary amino group as at least one reactive functional group. Suitability for preparing an inventively employed aqueous sol-gel composition (B) of this kind is possessed by at least two starting compounds different from one another, which are subjected to hydrolysis and condensation with water, with each of the starting compounds having a $C_{1-10}$ aliphatic radical as a nonhydrolyzable organic radical such as $R^1$, for example, of which one has at least one epoxide group as a reactive functional group and the other has at least one primary amino group or at least one secondary amino group as reactive functional group. The epoxide group of the nonhydrolyzable organic radical in this case is converted by reaction with water into a corresponding organic radical having an α,β-dihydroxy group.

In one preferred embodiment the aqueous sol-gel composition (B) used in preparing the aqueous coating composition inventively employed aqueous dispersion or solution is obtainable by reacting
at least two starting compounds, each independently of one another having at least one metal atom and/or semimetal atom such as $M^1$, for example, and also each independently of one another having at least two hydrolyzable groups such as at least two hydrolyzable groups $X^1$, for example,
where the at least two hydrolyzable groups are preferably each bonded directly by means of single bonds to the metal atom and/or semimetal atom present in each case in the at least two starting compounds,
with water,
where preferably at least one of the at least two starting compounds has not only the at least two hydrolyzable groups but also at least one nonhydrolyzable group, more preferably at least one nonhydrolyzable organic radical such as the radical $R^1$, for example, and this nonhydrolyzable group is, in particular, attached directly by means of a single bond to the metal atom and/or semimetal atom, such as $M^1$, that is present in the at least one starting compound, and optionally comprises at least one reactive functional group which is preferably selected from the group consisting of primary amino groups, secondary amino groups, epoxide groups, thiol groups, isocyanate groups, phosphorus-containing groups such as phosphonate groups, silane groups, which may optionally in turn have at least one nonhydrolyzable organic radical which optionally has at least one reactive functional group, and groups which have an ethylenically unsaturated double bond, such as vinyl groups or (meth)acrylic groups, is especially preferably selected from the group consisting of primary amino groups, secondary amino groups, epoxide groups, thiol groups, and groups which have an ethylenically unsaturated double bond, such as vinyl groups or (meth)acrylic groups, more particularly selected from the group consisting of primary amino groups and epoxide groups.

The aqueous sol-gel composition (B) used in preparing the coating composition of the invention is preferably obtainable by reaction of at least one compound

(A1)

and/or

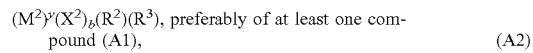
(A2)

with water, in which
$M^1$ and $M^2$ each independently of one another are a metal atom or a semimetal atom, with preferably at least one of the variables $M^1$ and $M^2$, more preferably both of the variables $M^1$ and $M^2$, standing for Si,
$X^1$ and $X^2$ each independently of one another are a hydrolyzable group,
x is the valence of the metal atom or semimetal atom $M^1$, preferably in each case+3 or +4,
y is the valence of the metal atom or semimetal atom $M^2$, preferably in each case+3 or +4,
$R^1$ is $X^1$, a nonhydrolyzable organic radical, or is (T)$(M^1)^x(X^1)_c$ or is (U)$[(M^1)^x(X^1)_c]_2$, preferably a nonhydrolyzable organic radical,
$R^2$ is a nonhydrolyzable organic radical,
$R^3$ is a nonhydrolyzable organic radical, is (T)$(M^1)^x(X^1)_c$, is (U)$[(M^1)^x(X^1)_c]_2$, is (V)$(M^2)^y(X^2)_d(R^2)$, or is (W)$[(M^2)^y(X^2)_d(R^2)]_2$, preferably a non-hydrolyzable organic radical,
a is x if $R^1$ is $X^1$ or
a is x-1 if $R^1$ is a nonhydrolyzable organic radical, is (T)$(M^1)^x(X^1)_c$ or is (U)$[(M^1)^x(X^1)_c]_2$, in each case subject to the proviso that a is at least 2,
b is y-2,
subject to the proviso that b is at least 2,
T, U, V and W in each case independently of one another are a radical which has 1 to 30 carbon atoms and may optionally have up to 10 heteroatoms and heteroatom groups selected from the group consisting of O, S, and N,
c is x-1, preferably subject to the proviso that c is at least 2, and
d is y-2, preferably subject to the proviso that d is at least 2,
with water.

The skilled person is aware of the term "hydrolyzable group". Any customary hydrolyzable group known to the skilled person, such as $X^1$ or $X^2$, for example, may serve as a constituent of the at least one starting compound used in preparing the aqueous sol-gel composition, more particularly of the at least one component (A1) and/or (A2).

A "hydrolyzable group", such as the groups $X^1$ and $X^2$, for example, refers in the sense of the present invention preferably to a hydrolyzable group selected from the group consisting of halides, preferably fluorides, chlorides, bromides, and iodides, more particularly fluorides and chlorides, alkoxy groups, preferably alkoxy groups O—$R^a$, in which $R^a$ is an optionally $C_{1-6}$-alkoxy-substituted $C_{1-16}$ aliphatic radical, preferably $C_{1-10}$ aliphatic radical, more preferably $C_{1-6}$ aliphatic radical, more particularly $C_{1-6}$ alkyl radical, such as for methyl, ethyl, n-propyl, isopropyl, n-butyl, isobutyl, or tert-butyl, or carboxylate groups, preferably $C_{1-6}$ carboxylate groups, more particularly carboxylate groups selected from the group consisting of acetate, and very preferably diketonate groups selected from the group consisting of acetylacetonate, acetonylacetonate, and diacetylate.

A "hydrolyzable group", such as, for example, the groups $X^1$ and $X^2$, refers more preferably to an alkoxy group, preferably an alkoxy group O—$R^a$, in which $R^a$ is an optionally $C_{1-6}$-alkoxy-substituted $C_{1-16}$ aliphatic radical, preferably $C_{1-10}$ aliphatic radical, more preferably $C_{1-6}$ aliphatic radical, more particularly $C_{1-6}$ alkyl radical, such as for methyl, ethyl, n-propyl, isopropyl, n-butyl, isobutyl, or tert-butyl.

The skilled person is familiar with the term "valence" in connection with metal atoms or semimetal atoms such as $M^1$ and $M^2$. In the sense of the present invention, the valence preferably denotes the oxidation number of the respective metal atom or semimetal atom such as $M^1$ and $M^2$, for example. Valences for x and y—in each case independently of one another—are preferably +2, +3, and +4, more particularly +3 and +4.

Suitable metal atoms such as $M^1$ and $M^2$, for example, are all customary metal atoms, including transition metal atoms, which may be a constituent of the at least one starting compound, more particularly (A1) and/or (A2), such as Al, Ti, Zr, and Fe, for example, preferably Ti and Zr. Suitable semimetal atoms such as $M^1$ and $M^2$, for example, are all customary semimetal atoms which may be a constituent of the at least one starting compound, more particularly (A1) and/or (A2), such as B and Si, for example, preferably Si.

The metal atoms and semimetal atoms, such as $M^1$ and $M^2$, for example, are preferably selected in each case independently of one another from the group consisting of Al, Ti, Zr, Fe, B, and Si, more preferably from the group consisting of Ti, Zr, and Si, very preferably from the group consisting of Zr and Si. In particular the metal atoms and semimetal atoms such as $M^1$ and $M^2$, for example, each denote Si.

$M^1$ more particularly is selected from the group consisting of Al, Ti, Zr, Fe, B, and Si, more preferably from the group consisting of Ti, Zr, and Si, very preferably from the group consisting of Zr and Si, and more particularly $M^1$ is Si. Preferably $M^2$ is Si.

The valences x, y, and z of the metal atoms and semimetal atoms such as $M^1$ and $M^2$, for example, are preferably selected such that the metal atoms and semimetal atoms such as $M^1$ and $M^2$, for example, are selected in each case independently of one another from the group consisting of $Al^{3+}$, $Ti^{4+}$, $Zr^{4+}$, Fe, $Fe^{4+}$, $B^{3+}$, and $Si^{4+}$, more preferably from the group consisting of $Al^{3+}$, $Ti^{4+}$, $Zr^{4+}$, and $Si^{4+}$, very preferably from the group consisting of $Ti^{4+}$, $Zr^{4+}$, and $Si^{4+}$, and more particularly are each $Si^{4+}$.

The skilled person is aware of the term "nonhydrolyzable organic radical". Any customary organic radical which is known to the skilled person and is nonhydrolyzable may serve as a constituent of the at least one starting compound used in preparing the aqueous sol-gel composition (B), more particularly of the at least one component (A1) and/or (A2).

A "nonhydrolyzable organic radical", in connection for example with the radicals $R^1$, $R^2$, and $R^3$, in each case independently of one another, refers preferably to a nonhydrolyzable organic radical selected from the group consisting of $C_{1-10}$ aliphatic radicals, $C_{1-10}$ heteroaliphatic radicals, $C_{3-10}$ cycloaliphatic radicals, 3-10-membered heterocycloaliphatic radicals, 5-12-membered aryl or heteroaryl radicals, $C_{3-10}$ cycloaliphatic radicals bonded via a $C_{1-6}$ aliphatic radical, 3-10-membered heterocycloaliphatic radicals bonded via a $C_{1-6}$ aliphatic radical, 5-12-membered aryl or heteroaryl radicals bonded via a $C_{1-6}$ aliphatic radical, it being possible for each of these radicals optionally to comprise at least one reactive functional group, provided the bond of the nonhydrolyzable organic radical to the metal atom or semimetal atom such as $M^1$ and/or $M^2$, for example, especially if $M^1$ and/or $M^2$ are each Si, cannot be cleaved hydrolytically under customary reaction conditions known to the skilled person.

The expression "$C_{1-10}$ aliphatic radical" in the sense of this invention encompasses preferably acyclic saturated or unsaturated, preferably saturated, aliphatic hydrocarbon radicals, i.e., $C_{1-10}$ aliphatic radicals which may in each case be branched or unbranched and also unsubstituted or mono- or polysubstituted, having 1 to 10 carbon atoms, i.e., $C_{1-10}$ alkanyls, $C_{2-10}$ alkenyls, and $C_2$-10 alkynyls. Alkenyls have at least one C=C double bond, and alkynyls have at least one C≡C triple bond. Preference is given to a $C_{1-10}$ aliphatic radical selected from the group which encompasses methyl, ethyl, n-propyl, 2-propyl, n-butyl, isobutyl, sec-butyl, tert-butyl, n-pentyl, isopentyl, neopentyl, n-hexyl, n-heptyl, n-octyl, n-nonyl, and n-decyl.

The expression "$C_{1-10}$ heteroaliphatic radical" in the sense of this invention encompasses preferably $C_{1-10}$ aliphatic radicals in which at least one, alternatively optionally 2 or 3, carbon atom or atoms has or have been replaced by a heteroatom such as N, O, or S or by a heteroatom group such as NH, N($C_{1-10}$ aliphatic radical), or N($C_{1-10}$ aliphatic radical)$_2$.

The expression "$C_{3-10}$ cycloaliphatic radical" in the sense of the invention encompasses preferably cyclic aliphatic (cycloaliphatic) hydrocarbons having 3, 4, 5, 6, 7, 8, 9, or 10 carbon atoms, it being possible for the hydrocarbons to be saturated or unsaturated (but not aromatically), unsubstituted or mono- or polysubstituted. The bonding of the $C_{3-10}$ cycloaliphatic radical to the respective superordinate general structure may take place by any desired and possible ring member of the $C_{3-10}$ cycloaliphatic radical, but is preferably via a carbon atom. The $C_{3-10}$ cycloaliphatic radicals may also be singly or multiply bridged, such as, for example, in the case of adamantyl, bicyclo[2.2.1]heptyl, or bicyclo[2.2.2]octyl. Preference is given to a $C_{3-10}$ cycloaliphatic radical selected from the group which encompasses cyclopropyl, cyclobutyl, cyclopentyl, cyclohexyl, and cycloheptyl.

The expression "3-10-membered heterocycloaliphatic radical" encompasses preferably aliphatic saturated or unsaturated (but not aromatic) cycloaliphatic radicals having three to ten, i.e., 3, 4, 5, 6, 7, 8, 9, or 10, ring members, in which at least one, optionally alternatively 2 or 3, carbon atoms has or have been replaced by a heteroatom such as N, O, or S, or by a heteroatom group such as NH, N($C_{1-10}$-aliphatic radical) or N($C_{1-10}$-aliphatic radical)$_2$, it being possible for the ring members to be unsubstituted or mono- or polysubstituted. The bonding to the superordinate general structure may be via any desired and possible ring member of the heterocycloaliphatic radical, but is preferably via a carbon atom. Preference is given to 3-10-membered heterocycloaliphatic radicals from the group encompassing azetidinyl, aziridinyl, azepanyl, azocanyl, diazepanyl, dithiolanyl, dihydroquinolyl, dihydropyrrolyl, dioxanyl, dioxolanyl, dioxepanyl, dihydroindenyl, dihydropyridyl, dihydrofuranyl, dihydroisoquinolyl, dihydroindolinyl, dihydroisoindolyl, imidazolidinyl, isoxazolidinyl, morpholinyl, oxiranyl, oxetanyl, pyrrolidinyl, piperazinyl, 4-methylpiperazinyl, piperidyl, pyrazolidinyl, pyranyl, tetrahydropyrrolyl, tetrahydropyranyl, tetrahydroquinolyl, tetrahydro-isoquinolyl, tetrahydroindolinyl, tetrahydrofuranyl, tetrahydropyridyl, tetrahydrothiophenyl, tetrahydro-pyridoindolyl, tetrahydronaphthyl, tetrahydro-carbolinyl, tetrahydroisoxazolopyridyl, thiazolidinyl, and thiomorpholinyl.

The term "aryl" in the sense of this invention denotes aromatic hydrocarbons having 6 to 12 ring members, preferably 6 ring members, including phenyls and naphthyls. Each aryl radical may be unsubstituted or singly or multiply substituted, it being possible for the aryl substituents to be identical or different and to be in any desired and possible position of the aryl. The bonding of the aryl to the superordinate general structure may be via any desired and possible ring member of the aryl radical. Aryl is selected preferably from the group containing phenyl, 1-naphthyl, and 2-naphthyl.

The term "heteroaryl" stands for a 5- to 12-membered, preferably 5- or 6-membered cyclic aromatic radical which contains at least 1, optionally also 2, 3, 4 or 5 heteroatoms, the heteroatoms being selected each independently of one another from the group S, N, and O, and it being possible for the heteroaryl radical to be unsubstituted or mono- or polysubstituted; in the case of substitution on the heteroaryl, the substituents may be identical or different and may be in any desired and possible position of the heteroaryl. Bonding to the superordinate general structure may be via any desired and possible ring member of the heteroaryl radical. It is preferred for the heteroaryl radical to be selected from the group which encompasses benzofuranyl, benzimidazolyl, benzothienyl, benzothiadiazolyl, benzothiazolyl, benzotriazolyl, benzoxazolyl, benzoxadiazolyl, quinazolinyl, quinoxalinyl, carbazolyl, quinolyl, dibenzofuranyl, dibenzothienyl, furyl (furanyl), imidazolyl, imidazothiazolyl, indazolyl, indolizinyl, indolyl, isoquinolyl, isoxazolyl, isothiazolyl, indolyl, naphthyridinyl, oxazolyl, oxadiazolyl, phenazinyl, phenothiazinyl, phthalazinyl, pyrazolyl, pyridyl (2-pyridyl, 3-pyridyl, 4-pyridyl), pyrrolyl, pyridazinyl, pyrimidinyl, pyrazinyl, purinyl, phenazinyl, thienyl (thiophenyl), triazolyl, tetrazolyl, thiazolyl, thiadiazolyl, or triazinyl.

The expression "$C_3$-$C_{10}$ cycloaliphatic radical, 3-10-membered heterocycloaliphatic radical, 5-12-membered aryl or heteroaryl radical bonded via a $C_{1-6}$ aliphatic radical" means preferably that the stated radicals have the definitions defined above and are each bonded via a $C_{1-6}$ aliphatic radical to the respective superordinate general structure, it being possible for said aliphatic radical to be branched or unbranched, saturated or unsaturated, and unsubstituted or monosubstituted or polysubstituted.

If a radical or a group such as, for example, the group $X^1$ within the compound (A1), or a nonhydrolyzable organic radical such as the radicals $R^2$ and $R^3$ within the compound (A2), occurs multiply within one molecule, then this radical or this group may in each case have identical or different definitions: if, for example, the group $X^1$ is O—$R^a$, where $R^a$ is a $C_{1-6}$ aliphatic radical, and if, for example, it occurs a total of three times within the molecule $(M^1)^x(X^1)_a(R^1)$, then $X^1$ may, for example, be O—$C_2H_5$ each of the three times, or may be once O—$C_2H_5$, once O—$CH_3$, and once O—$C_3H_6$. If $R^2$ and $R^3$ within (A2) are each a nonhydrolyzable organic radical, then one of these radicals, for example, may have at least one reactive functional group, and the remaining radical may have no reactive functional group.

The radicals T, U, V, and W are, in each case independently of one another, a radical which has 1 to carbon atoms and may optionally have up to 10 heteroatoms and heteroatom groups selected from the group consisting of O, S, and N. These radicals T, U, V, and W may be aliphatic, heteroaliphatic, cycloaliphatic, heterocycloaliphatic, aromatic, or heteroaromatic radicals, and partially (hetero)aromatic radicals as well are possible, i.e., (hetero)aromatic radicals which are substituted by at least one aliphatic, heteroaliphatic, cycloaliphatic and/or heterocycloaliphatic group. To the skilled person it is clear that the radicals T, U, V, and W are divalent or trivalent and function as bridging organic groups between two or three metal and/or semimetal atoms. If, for example, $R^1$ is $(U)[(M^1)^x(X^1)_c]_2$, then U is a trivalent group which bridges a radical $(M^1)^x(X^1)_a$ with two radicals $[(M^1)^x(X^1)_c]$.

Within the compound $(M^1)^x(X^1)_a(R^1)$ used as component (A1), all of the groups $X^1$ preferably have the same definition; more preferably, all of the groups $X^1$ within the compound $(M^1)^x(X^1)_a(R^1)$ used as component (A1) stand for O—$R^a$, where $R^a$ is preferably a $C_{1-6}$ aliphatic radical, more particularly a $C_{1-6}$ alkyl radical, most preferably wherein $R^a$ is methyl, ethyl, n-propyl, isopropyl, n-butyl, isobutyl, or tert-butyl.

Within the compound used as component (A2), all of the groups $X^2$ preferably have the same definition; more preferably, all of the groups $X^2$ within the compound used as component (A2) stand for O—$R^a$, where $R^a$ is a $C_{1-6}$ aliphatic radical, more particularly a $C_{1-6}$ alkyl radical, most preferably wherein $R^3$ is methyl, ethyl, n-propyl, isopropyl, n-butyl, isobutyl, or tert-butyl.

With preference $M^1$ and $M^2$ are selected each independently from one another from the group consisting of Al, Ti, Zr, Fe, B, and Si, more preferably from the group consisting of Al, Ti, Zr, and Si, very preferably from the group consisting of Ti, Zr, and Si, especially preferably from the group consisting of Zr and Si, and most preferably $M^1$ and $M^2$ are each Si, or $M^1$ is selected from the group consisting of Al, Ti, Zr, Fe, B, and Si, more preferably selected from the group consisting of Al, Ti, Zr, and Si, very preferably selected from the group consisting of Ti, Zr, and Si, especially preferably selected from the group consisting of Zr and Si, most preferably Si, and $M^2$ is Si, $X^1$ and $X^2$ each independently of one another are an alkoxy group O—$R^a$, where $R^a$ is in each case a $C_{1-6}$ aliphatic radical, preferably a $C_{1-6}$ alkyl radical, more preferably in which $R^3$ is methyl, ethyl, n-propyl, isopropyl, n-butyl, isobutyl, or tert-butyl.

The aqueous sol-gel composition (B) used in preparing the aqueous coating composition of the invention is preferably obtainable by reaction of at least one compound (A1) as at least one starting compound, in which $R^1$ is a nonhydrolyzable organic radical which has at least one reactive functional group selected from the group consisting of primary amino groups, secondary amino groups, epoxide groups, thiol groups, isocyanate groups, phosphorus-containing groups, and groups which have an ethylenically unsaturated double bond, in particular at least one compound (A1) as at least one starting compound, in which $R^1$ is a nonhydrolyzable organic radical which has at least one epoxide group as a reactive functional group, and further in particular at least one further compound (A1) as at least one starting compound, in which $R^1$ is a nonhydrolyzable organic radical which has at least one reactive functional group selected from the group consisting of primary amino groups and secondary amino groups, and optionally at least one further compound (A1), in which $R^1$ is $X^1$, and optionally at least one further compound (A1), in which $R^1$ is a nonhydrolyzable organic radical which has no reactive functional group, and optionally at least one compound (A2).

The aqueous sol-gel composition (B) used for preparing the aqueous coating composition inventively employed is preferably obtainable by reaction of at least one compound $Si(X^1)_3(R^1)$ as at least one compound (A1-1),
  where $R^1$ therein is a nonhydrolyzable organic radical which has at least one reactive functional group selected from the group consisting of primary amino groups, secondary amino groups, epoxide groups, and groups which have an ethylenically unsaturated double bond,
  in particular at least one compound $Si(X^1)_3(R^1)$ as at least one compound (A1-1a), where $R^1$ therein is a nonhydrolyzable organic radical which has at least one epoxide group as a reactive functional group, and further
  in particular at least one further compound $Si(X^1)_3(R^1)$ as at least one further compound (A1-1b),
  where $R^1$ therein is a nonhydrolyzable organic radical which has at least one reactive functional group selected from the group consisting of primary amino groups and secondary amino groups,
and optionally at least one compound $Si(X^1)_4$ as at least one further compound (A1-2),
and optionally at least one compound $Si(X^1)_3(R^1)$ as at least one further compound (A1-3),
  where $R^1$ therein is a nonhydrolyzable organic radical which has no reactive functional group,
and optionally at least one compound $Zr(X^1)_4$ as at least one further compound (A1-4),
with water.

In one particularly preferred embodiment the aqueous sol-gel composition (B) used in preparing the aqueous coating composition of the invention is obtainable by reaction of
at least one compound $Si(X^1)_3(R^1)$ as at least one compound (A1-1a),
  where $R^1$ therein is a nonhydrolyzable organic radical which has at least one reactive functional group selected from the group consisting of primary amino groups, secondary amino groups, epoxide groups, and groups which have an ethylenically unsaturated double bond, more particularly at least one epoxide group,
  and where the nonhydrolyzable organic radical is preferably selected from the group consisting of $C_1$-$C_{10}$ aliphatic radicals and $C_1$-$C_{10}$ heteroaliphatic radicals, more preferably selected from $C_{1-10}$ aliphatic radicals,
  $X^1$ is $OR^a$ and $R^a$ a is $C_{1-6}$-alkyl radical,
at least one further compound $Si(X^1)_3(R^1)$ as at least one further compound (A1-1b),
  where $R^1$ therein is a nonhydrolyzable organic radical which has at least one reactive functional group selected from the group consisting of primary amino groups, secondary amino groups, epoxide groups, and groups which have an ethylenically unsaturated double bond, more particularly at least one primary amino group or one secondary amino group,
  and where the nonhydrolyzable organic radical is preferably selected from the group consisting of $C_{1-10}$ aliphatic radicals and $C_{1-10}$ heteroaliphatic radicals, more preferably selected from $C_{1-10}$ aliphatic radicals,
  $X^1$ is $OR^a$ and $R^a$ is a $C_{1-6}$ alkyl radical,
and optionally at least one compound $Si(X^1)_4$ as at least one further compound (A1-2), in which $X^1$ is $OR^a$ and $R^a$ is a $C_{1-6}$ alkyl radical,
and optionally at least one compound $Si(X^1)_3(R^1)$ as at least one further compound (A1-3),
  where $R^1$ therein is a nonhydrolyzable organic radical which has no reactive functional group,
  and where the nonhydrolyzable organic radical is preferably selected from the group consisting of $C_1$-$C_{10}$ aliphatic radicals, $C_1$-$C_{10}$ heteroaliphatic radicals, 5-12-membered aryl or heteroaryl radicals, and 5-12-membered aryl or heteroaryl radicals bonded via a $C_{1-6}$ aliphatic radical,
  and $X^1$ is $OR^a$ and $R^a$ is a $C_{1-6}$ alkyl radical,
and optionally at least one compound $Zr(X^1)_4$ as at least one further compound (A1-4), in which $X^1$ is $OR^a$ and $R^a$ is a $C_{1-6}$ alkyl radical,
with water.

With particular preference the aqueous sol-gel composition (B) used in preparing the aqueous coating composition inventively employed is obtainable by reaction of
at least one compound $Si(X^1)_3(R^1)$ as at least one compound (A1-1a),
  where $R^1$ therein is a nonhydrolyzable $C_1$-$C_{10}$ aliphatic organic radical which has at least one epoxide group as reactive functional group,
  $X^1$ is $OR^a$ and $R^a$ is a $C_{1-6}$ alkyl radical,
at least one further compound $Si(X^1)_3(R^1)$ as at least one further compound (A1-1b),
  where $R^1$ therein is a nonhydrolyzable $C_{1-10}$ aliphatic organic radical which has at least one primary amino group as reactive functional group,
  $X^1$ is $OR^a$ and $R^a$ is a $C_{1-6}$ alkyl radical,
and optionally at least one compound $Si(X^1)_4$ as at least one further compound (A1-2),
  in which $X^1$ is $OR^a$ and $R^a$ is a $C_{1-6}$ alkyl radical,
and optionally at least one compound $Si(X^1)_3(R^1)$ as at least one further compound (A1-3),
  where $R^1$ therein is a nonhydrolyzable organic $C_1$-$C_{10}$ aliphatic radical which has no reactive functional group,
  and in which the nonhydrolyzable organic radical $R^1$ is preferably selected from the group consisting of $C_1$-$C_{10}$ aliphatic radicals, 5-12-membered aryl or heteroaryl radicals, and 5-12-membered aryl or heteroaryl radicals bonded via a $C_{1-6}$ aliphatic radical,
  and $X^1$ is $OR^a$ and $R^a$ is a $C_{1-6}$ alkyl radical,
and optionally at least one compound $Zr(X^1)_4$ as at least one further compound (A1-4), in which $X^1$ is $OR^a$ and $R^a$ is a $C_{1-6}$ alkyl radical,
with water.

With more particular preference the aqueous sol-gel composition (B) used in preparing the aqueous coating composition inventively employed is obtainable by reaction of
at least one compound $Si(X^1)_3(R^1)$ as at least one compound (A1-1a),
  where $R^1$ therein is a nonhydrolyzable $C_1$-$C_{10}$ aliphatic organic radical which has at least one epoxide group as reactive functional group,
  $X^1$ is $OR^a$ and $R^a$ is a $C_{1-6}$ alkyl radical,
at least one further compound $Si(X^1)_3(R^1)$ as at least one further compound (A1-1b),
  where $R^1$ therein is a nonhydrolyzable $C_{1-10}$ aliphatic organic radical which has at least one primary amino group as reactive functional group,
  $X^1$ is $OR^a$ and $R^a$ is a $C_{1-6}$ alkyl radical,
and at least one compound $Si(X^1)_4$ as at least one compound (A1-2),
  in which $X^1$ is $OR^a$ and $R^a$ is a $C_{1-6}$ alkyl radical,
and at least one compound $Si(X^1)_3(R^1)$ as at least one further compound (A1-3), where $R^1$ therein is a nonhydrolyzable organic $C_1$-$C_{10}$ aliphatic radical which has no reactive functional group, and in which the nonhydrolyzable organic radical $R^1$ is preferably selected from the group consisting of $C_1$-$C_{10}$ aliphatic radicals, 5-12-membered aryl or heteroaryl radicals, and 5-12-membered aryl or heteroaryl radicals bonded via a $C_{1-6}$ aliphatic radical, and is more preferably selected from $C_{1-10}$ aliphatic radicals, and $X^1$ is OR' and $R^a$ is a $C_{1-6}$ alkyl radical, with water.

Where the aqueous sol-gel composition (B) used in accordance with the invention is prepared using at least two starting compounds, such as, for example, two compounds (A1) different from one another, such as (A1-1a) and (A1-1b), the relative weight ratio of these two components to one another, such as (A1-1a) and (A1-1b), for example, is preferably in a range from 10:1 to 1:10, more preferably in a range from 7.5:1 to 1:7.5, very preferably in a range from 5:1 to 1:5, more particularly in a range from 2:1 to 1:2.

Where the aqueous sol-gel composition used in accordance with the invention is prepared using at least three starting compounds, such as, for example, three compounds (A1) different from one another, such as (A1-1a), (A1-1b) and (A1-2), the relative weight ratio of the components (A1-1a), (A1-1b) and (A1-2) to one another is preferably in a range from 5:1:1 to 1:1:5 or in a range from 5:1:1 to 1:5:1 or in a range from 1:5:1 to 5:1:1 or in a range from 1:5:1 to 1:1:5 or in a range from 1:1:5 to 5:1:1 or in a range from 1:1:5 to 1:5:1, more preferably in a range from 2:1:1 to 1:1:2 or in a range from 2:1:1 to 1:2:1 or in a range from 1:2:1 to 2:1:1 or in a range from 1:2:1 to 1:1:2 or in a range from 1:1:2 to 2:1:1 or in a range from 1:1:2 to 1:2:1.

Where the aqueous sol-gel composition used in accordance with the invention is prepared using at least four starting compounds, such as, for example, four compounds (A1) different from one another, as for example the compounds designated above as (A1-1a), (A1-1b), (A1-2), and (A1-3), the relative weight ratio of the components (A1-1a), (A1-1b), (A1-2) and (A1-3) to one another is situated preferably in a range from 5:1:1:1 to 1:1:1:5 or from 5:1:1:1 to 1:1:5:1 or from 5:1:1:1 to 1:5:1:1 or from 5:1:1:1 to 1:5:1:1 or from 1:5:1:1 to 1:1:5:1 or from 1:5:1:1 to 1:1:1:5 or from 1:1:5:1 to 5:1:1:1 or from 1:1:5:1 to 1:5:1:1 or from 1:1:5:1 to 1:1:1:5 or from 1:1:1:5 to 5:1:1:1 or from 1:1:1:5 to 1:5:1:1 or from 1:1:1:5 to 1:1:5:1 more preferably in a range from 2:1:1:1 to 1:1:1:2 or from 2:1:1:1 to 1:1:2:1 or from 2:1:1:1 to 1:2:1:1 or from 1:2:1:1 to 2:1:1:1 or from 1:2:1:1 to 1:1:2:1 or from 1:2:1:1 to 1:1:1:2 or from 1:1:2:1 to 2:1:1:1 or from 1:1:2:1 to 1:2:1:1 or from 1:1:2:1 to 1:1:1:2 or from 1:1:1:2 to 2:1:1:1 or from 1:1:1:2 to 1:2:1:1 or from 1:1:1:2 to 1:1:5:1.

In one especially preferred embodiment the relative weight ratio of components (A1-1a), (A1-1b), (A1-2) and (A1-3) to one another is in a range from 2.2:0.5:1.2:1.2 to 2:05:1:1.

Suitability for preparing the aqueous sol-gel composition (B) is possessed by, for example, at least one compound $(M^1)^x(X^1)_a(R^1)$ as component (A1), in which $R^1$ has the definition $X^1$. Examples of such compounds are tetramethoxysilane (TMOS), tetraethoxysilane (TEOS), dimethoxydiethoxysilane, tetrapropoxysilane, tetra-isopropoxysilane, tetrabutoxysilane, titanium tetraiso-propoxide, titanium tetrabutoxide, zirconium tetraiso-propoxide, and zirconium tetrabutoxide.

Suitability for preparing the aqueous sol-gel composition (B) is possessed by, for example, at least one compound $(M^1)^x(X^1)_a(R^1)$ as component (A1), in which $R^1$ is a nonhydrolyzable organic radical, it being possible for the nonhydrolyzable organic radical $R^1$ to have optionally at least one reactive functional group.

If the nonhydrolyzable organic radical $R^1$ here has at least one group which comprises a vinyl group as ethylenically unsaturated double bond, then suitability as component (A1) is possessed by, for example, vinyltrimethoxysilane (VTMS), vinyltriethoxysilane, vinyltriisopropoxysilane, vinyltrichlorosilane, vinyl-tris(2-methoxyethoxy)silane, vinyltriacetoxysilane, p-styryltrimethoxysilane, and/or p-styryltriethoxysilane.

If the nonhydrolyzable organic radical $R^1$ here has at least one group which comprises a (meth)acrylic group as ethylenically unsaturated double bond, then suitability as component (A1) is possessed by, for example, γ-(meth)-acryloyloxypropyltrimethoxysilane (MAPTS), γ-(meth)-acryloyloxypropyltriethoxysilane, γ-(meth)acryloyloxypropyltriisopropoxysilane, β-(meth)acryloyloxyethyltrimethoxysilane, β-(meth)acryloyloxyethyltriethoxysilane, β-(meth)acryloyloxyethyltriisopropoxysilane, 3-(meth)acryloyloxypropyltriacetoxysilane, (meth)acrylamido-propyltriethoxysilane, (meth)acrylamidopropyltrimethoxy-silane, (meth)acrylamidopropyldimethoxyethoxysilane and/or (meth)acrylamidopropylmethoxydiethoxysilane.

If the nonhydrolyzable organic radical $R^1$ here has at least one group which comprises an isocyanate group, then suitability as component (A1) is possessed by, for example, γ-isocyanatopropyltriethoxysilane and/or γ-isocyanatopropyltrimethoxysilane.

If the nonhydrolyzable organic radical $R^1$ here has at least one group which comprises at least one primary and/or secondary amino group, then suitability as component (A1) is possessed by, for example, 3-aminopropyltrimethoxysilane (APS), 3-aminopropyltriethoxysilane, 3-aminopropyltriisopropoxysilane, 2-aminoethyltrimethoxysilane, 2-aminoethyltriethoxysilane, 2-aminoethyltriisopropoxysilane, aminomethyltrimethoxy-silane, aminomethyltriethoxysilane, aminomethyltri-isopropoxysilane, 3-(2-aminoethyl)aminopropyltrimethoxysilane (AEAPS), 3-(2-aminoethyl)aminopropyltriethoxysilane, 3-(2-aminoethyl)aminopropyltriisopropoxysilane, 2-(2-aminoethyl)aminoethyltrimethoxysilane, 2-(2-amino-ethyl)aminoethyltriethoxysilane, 2-(2-aminoethyl)aminoethyltriisopropoxysilane, 3-(3-aminopropyl)aminopropyltrimethoxysilane, 3-(3-aminopropyl)aminopropyltriethoxysilane, 3-(3-aminopropyl)aminopropyltriisopropoxysilane, diethylenetriaminopropyltrimethoxysilane, diethylene-triaminopropyltriethoxysilane, N-(n-butyl)-3-aminopropyltrimethoxysilane, N-(n-butyl)-3-aminopropyltriethoxysilane, N-cyclohexylaminomethyltriethoxysilane, N-cyclo-hexylaminomethyltrimethoxysilane, N-ethyl-γ-aminoisobutyltrimethoxysilane, N-ethyl-γ-aminoisobutyltriethoxysilane, N-(vinylbenzyl)-2-aminoethyl-3-aminopropyltrimethoxysilane hydrochloride, N-phenyl-γ-aminopropyltrimethoxysilane, N-phenyl-γ-aminopropyltriethoxysilane, γ-ureidopropyl-trimethoxysilane, γ-ureidopropyltriethoxysilane, N-methyl-[3-(trimethoxysilyl)propyl]carbamate, and/or N-trimethoxy-silylmethyl-O-methylcarbamate.

If the nonhydrolyzable organic radical $R^1$ here has at least one group which comprises at least one epoxide group, then suitability as component (A1) is possessed by, for example, 3-glycidyloxypropyltrimethoxysilane (GPTMS), 3-glycidyloxypropyltriethoxysilane, 3-glycidyloxypropyl-triisopropoxysilane, 2-glycidyloxyethyltrimethoxysilane, 2-glycidyloxyethyltriethoxysilane, 2-glycidyloxyethyltriisopropoxyoxysilane, β-(3,4-epoxycyclohexyl)ethyltrimethoxysilane, and/or β-(3,4-epoxycyclohexyl)ethyltriethoxysilane.

If the nonhydrolyzable organic radical $R^1$ here has at least one group which comprises at least one thiol group, then suitability as component (A1) is possessed by, for example, 3-mercaptopropyltrimethoxysilane (MPTMS), 3-mercaptopropyltriethoxysilane, 3-mercapto-propyltriisopropoxysilane, 2-mercaptoethyltrimethoxy-silane, 2-mercaptoethyltriethoxysilane and/or 2-mercapto-ethyltriisopropoxysilane.

If the nonhydrolyzable organic radical $R^1$ here has at least one group which is phosphorus-containing, then suitability as component (A1) is possessed by, for example, dimethylphosphonatoethyltrimethoxysilane, dimethylphosphonatoethyltriethoxysilane (PHS), dimethyl-phosphonatoethyltriisopropoxysilane, diethylphosphonatoethyltrimethoxysilane, diethylphosphonatoethyltriethoxysilane (PHS) and/or diethylphosphonatoethyltriisopropoxysilane.

Suitability for preparing the aqueous sol-gel composition (B) is possessed, moreover, by at least one compound $(M^1)^x(X^1)_a(R^1)$ as component (A1), in which $R^1$ is a nonhydrolyzable organic radical, it being possible for the nonhydrolyzable organic radical $R^1$ to have no reactive functional group.

If the nonhydrolyzable organic radical $R^1$ here has no reactive functional group, then suitability as component (A1) is possessed by, for example, methyltrimethoxysilane (MTMS), methyltriethoxysilane (MTES), methyltripropoxy-silane, methyltriisopropoxysilane, ethyltrimethoxysilane, ethyltriethoxysilane, ethyltripropoxysilane, ethyltri-isopropoxysilane, octyltrimethoxysilane, isobutyltri-ethoxysilane, isobutyltrimethoxysilane, octyltriethoxy-silane, hexyltrimethoxysilane, hexyltriethoxysilane, decyltrimethoxysilane, decyltriethoxysilane, hexadecyltrimethoxysilane, hexadecyltriethoxysilane, isooctyltrimethoxysilane, isooctyltriethoxysilane, phenyltrimethoxysilane (PHS), phenyltriethoxysilane, phenyltripropoxysilane, phenyltriisopropoxysilane, benzyltrimethoxysilane, benzyltriethoxysilane, benzyltripropoxysilane, benzyltriisopropoxysilane, octyltrichlorsilane, tridecafluorooctyltriethoxysilane, tridecafluorooctyltrimethoxysilane, 3-octanoylthio-1-propyltriethoxysilane, 3-octanoylthio-1-propyltrimethoxysilane, 3-triethoxysily-N-(1,3-dimethylbutylidenepropylamine, 3-chloropropyltrimethoxysilane and/or 3-chloropropyltriethoxysilane.

Suitability for preparing the aqueous sol-gel composition (B) is possessed by, for example, at least one compound $(M^1)^x(X^1)_a (R^1)$ as component (A1), in which $R^1$ is (T) $(M^1)^x(X^1)_c$. Examples of those suitable here include bis(trimethoxysilyl)ethane, bis(triethoxysilyl)ethane, bis-[γ-(triethoxysilyl)propyl]amine, bis-[γ-(trimethoxy-silyl)propyl]amine, bis(triethoxysilylpropyl) tetrasulfide and/or bis(trimethoxysilylpropyl) tetrasulfide. Suitability for preparing the aqueous sol-gel composition (B) is possessed by, for example, at least one compound $(M^1)^x(X^1)_a(R^1)$ as component (A1), in which $R^1$ is (U) $[(M^1)^x(X^1)_c]_2$. Examples of those suitable here include tris[3-(trimethoxysilyl)propyl]isocyanurate.

Suitability for preparing the aqueous sol-gel composition (B) is possessed by, for example, at least one compound $(M^2)^y(X^2)_b (R^2)(R^3)$ as component (A2), in which $R^2$ and $R^3$ independently of one another are each a nonhydrolyzable organic radical. Examples of those suitable here include 3-glycidyloxypropylmethyldiethoxysilane, 3-glycidyloxypropylmethyldimethoxysilane, γ-(meth)acryloyloxypropylmethyldimethoxysilane, 3-mercaptopropylmethyldimethoxy-silane, 3-mercaptopropylmethyldiethoxysilane, γ-(meth)-acryloxypropylmethyldiethoxysilane, N-(2-aminoethyl)-3-aminopropylmethyldimethoxysilane, N-(2-aminoethyl)-3-aminopropylmethyldiethoxysilane, 3-aminopropylmethyldiethoxysilane, 3-aminopropylmethyldimethoxysilane, dimethyldimethoxysilane, dimethyldiethoxysilane, di-tert-butoxydiacetoxysilane, vinyldimethoxymethylsilane, vinyldiethoxymethylsilane, N-cyclohexylamino-methylmethyl-diethoxysilane, N-cyclohexylaminomethylmethyldimethoxy-silane, (cyclohexyl)methyldimethoxysilane, dicyclopentyl-dimethoxysilane and/or N-dimethoxy(methyl)silylmethyl-O-methylcarbamate.

In one preferred embodiment the solids content of the aqueous sol-gel composition (B) used for preparing the coating composition of the invention, after hydrolysis and condensation of the at least one starting compound, is in a range from 0.4 up to 40 wt %, more preferably in a range from 0.8 up to 35 wt %, very preferably in a range from 1.2 up to 30 wt %, more particularly in a range from 1.6 up to 25 wt %, or in a range from 2.0 up to 20 wt % or in a range from 2.4 up to 15 wt % or in a range from 2.8 up to 10 wt % or in a range from 3.0 up to 7.0 wt %, based in each case on the total weight of the aqueous sol-gel composition (B).

The solids content of the aqueous sol-gel composition (B) used in accordance with the invention, more particularly of the inventively employed aqueous sol-gel composition (B) produced exclusively from at least one starting compound suitable for preparing the inventively employed aqueous sol-gel composition (B), may be determined by means of calculation from the amount of the at least one starting compound used in preparing the sol-gel composition (B). Complete hydrolysis of the hydrolyzable groups present in the at least one starting compound, such as of the hydrolyzable groups $X^1$, for example, and, furthermore, complete condensation of all of the metal-OH and/or semimetal-OH bonds formed by such complete hydrolysis, such as $M^1$-OH bonds, for example, is assumed in that case. For the calculation of the solids content of the aqueous sol-gel composition used in accordance with the invention, all of any single bonds present that are formed between a nonhydrolyzable group, such as a nonhydrolyzable organic radical such as $R^1$, and a metal atom or semimetal atom, such as $M^1$, are considered to form part of the solids content and are counted accordingly. The solids content of the aqueous sol-gel composition (B) used in accordance with the invention is preferably determined by means of this calculation method—in other words, the solids content specified in connection with the aqueous sol-gel composition (B) used in accordance with the invention is preferably the theoretically calculated solids content of said composition. This theoretically calculated solids content may be calculated for each of the at least one starting compound used in preparing the aqueous sol-gel composition (B) employed in accordance with the invention, in accordance with the general formula $$SC_{theo} = \frac{M_{cond}}{M_{start}} \cdot fraction_{formula}$$

in which $SC_{theo}$=theoretically calculated solids content in wt %,
$M_{cond}$=molar mass of the completely condensed starting compound, in g/mol, $M_{start}$=molar mass of the starting compound, in g/mol, and fraction$_{formula}$=fraction of the starting compound in the composition, in wt %.

The theoretically calculated total solids content is then obtained from the sum of the theoretically calculated solids contents of each starting compound used. An example calculation for determining the theoretically calculated solids content of an aqueous sol-gel composition (B) employed in accordance with the invention is given in section 1 of the experimental part (inventive and comparative examples). Where the inventively employed aqueous sol-gel composition (B) further comprises at least one further additive, the solids fraction of that additive must where appropriate be added onto the total solids content calculated theoretically from the at least one starting compound used for preparing (B).

The solids content calculated theoretically in this way is in agreement with a solids content determined according to an experimental method of determination, provided the inventively employed aqueous sol-gel composition (B) in question contains no further additive which has or brings with it its own solids fraction. In this experimental method of determination, the aqueous sol-gel composition (B) employed in accordance with the invention is dried over a time of 60 minutes at a temperature of 130° C. in accordance with DIN EN ISO 3251. The prepared, inventively employed, aqueous sol-gel composition (B) is in this case weighed out in an amount of 2±0.2 g and then dried in accordance with DIN EN ISO 3251.

In one preferred embodiment the sol-gel composition (B) present in the aqueous coating composition of the invention, after hydrolysis and condensation of the at least one starting compound, has a solids content in the range from 0.1 to 4 wt %, more preferably in a range from 0.2 to 3.5 wt %, very preferably in a range from 0.3 to 3 wt %, more particularly in a range from 0.4 to 2.5 wt % or in a range from 0.5 to 2 wt % or in a range from 0.5 to 1.5 wt % or in a range from 0.5 to 1 wt %, based in each case on the total weight of the aqueous coating composition of the invention.

The aqueous sol-gel composition (B) may optionally comprise at least one further additive, which is preferably selected from the group consisting of hydrolytically and pyrolytically prepared silica, organic and inorganic nanoparticles, each preferably having a particle size in a range from 1 to 150 nm as determinable by dynamic light scattering in accordance with DIN ISO 13 321, water-soluble or water-dispersible organic polymers, surface-active compounds such as surfactants, emulsifiers, antioxidants, wetting agents, dispersants, flow control assistants, solubilizers, defoamers, stabilizers, preferably heat stabilizers, processing stabilizers, and UV and/or light stabilizers, catalysts, waxes, flexibilizers, flame retardants, reactive diluents, carrier media, resins, adhesion promoters, processing assistants, plasticizers, solids in powder form, solids in fiber form, preferably solids in powder or fiber form selected from the group consisting of fillers, glass fibers, and reinforcing agents, and mixtures of the aforementioned additives. The additive content of the aqueous sol-gel composition (B) employed in accordance with the invention may vary very widely according to the end use. The amount, based in each case on the total weight of the aqueous sol-gel composition (B) employed in accordance with the invention, is preferably 0.1 to 10.0 wt %, more preferably 0.1 to 8.0 wt %, very preferably 0.1 to 6.0 wt %, especially preferably 0.1 to 4.0 wt %, and more particularly 0.1 to 2.0 wt %, and mixtures thereof.

The fractions in wt % of all of the components and additives, including water and optionally present organic solvents, present in the aqueous sol-gel composition (B) employed in accordance with the invention add up preferably to a total of 100 wt %, based on the total weight of the sol-gel composition (B).

Method for Producing the Coating Composition

A further subject of the present invention is a method for producing the aqueous coating composition of the invention, comprising at least the steps:

(a1) preparing the aqueous sol-gel composition (B) by reacting at least one starting compound suitable for preparing the sol-gel composition (B) with water, with hydrolysis and condensation of the at least one starting compound, and (a2) converting the aqueous sol-gel composition (B) obtained by step (a1) into an aqueous dispersion or solution (A) of at least one electrophoretically depositable binder and optionally of at least one crosslinking agent.

All preferred embodiments described hereinabove in connection with the aqueous coating composition of the invention are also preferred embodiments of the aqueous coating composition of the invention in relation to its production.

The aqueous dispersion or solution (A) here may comprise at least one of the optional components (C), (D) and/or (E). Alternatively these components may optionally be added in a step (a3) to the mixture obtained by step (a2).

The reaction of at least one starting compound suitable for preparing the sol-gel composition (B) with water, with hydrolysis and condensation of the at least one starting compound, takes place preferably within step (a1) of the method of the invention, by (a1-1) preparing a mixture comprising at least one compound (A1-1a), at least one compound (A1-2) and at least one compound (A1-3), (a1-2) reacting this mixture with water in the presence of at least one acid, preferably at least one acid selected from the group consisting of phosphoric acid, lactic acid, acetic acid, and formic acid, preferably at a pH of the resulting mixture in the range from 2 to 4, (a1-3) adding at least one compound (A1-1b) to the mixture obtained by step (a1-2).

Preferably in this case as compound (A1-1a) a compound $Si(X^1)_3(R^1)$ is used, where $R^1$ therein is a nonhydrolyzable $C_1$-$C_{10}$ aliphatic organic radical which has at least one epoxide group as reactive functional group, $X^1$ is OR' and $R^a$ is a $C_{1-6}$ alkyl radical, as compound (A1-1b) a compound $Si(X^1)_3(R^1)$ is used, where $R^1$ therein is a nonhydrolyzable $C_1$-$C_{10}$ aliphatic organic radical which has at least one primary amino group as reactive functional group, $x^1$ is OR$^a$ and $R^a$ is a $C_{1-6}$ alkyl radical, as compound (A1-2) a compound $Si(X^1)_4$ is used in which $X^1$ is OR$^a$ and $R^a$ is a $C_{1-6}$ alkyl radical, and as compound (A1-3) a compound $Si(X^1)_3(R^1)$ is used, where $R^1$ therein is a nonhydrolyzable organic $C_{1-10}$ aliphatic radical which has no reactive functional group, and $X^1$ is OR$^a$ and $R^a$ is a $C_{1-6}$ alkyl radical.

Step (a1-2) is preferably carried out until at least 50 mol % or at least 60 mol % or at least 70 mol %, more preferably at least 80 mol % or at least 90 mol %, of the epoxide groups contained within the compound (A1-1a), based on all of the epoxide groups present in (A1-1a) in mol %, have undergone reaction to form hydroxyl groups. A corresponding check on the reaction may be made by means of $^1$H nuclear magnetic resonance spectroscopy.

Step (a1-3) is preferably carried out until within 24 hours, the electrical conductivity of the mixture resulting after addition of at least one compound (A1-1b) changes by not more than 0.05 mS/cm.

The relative weight ratio of the components (A1-1a), (A1-1b), (A1-2) and (A1-3) in the preparation of (B) by steps (a1-1) to (a1-3) to one another is preferably in a range from 2.2:0.5:1.2:1.2 to 2:0.5:1:1.

Use

A further subject of the present invention is a use of the aqueous coating composition of the invention for at least partly coating an electrically conductive substrate with an electrocoat material.

All preferred embodiments described hereinabove in connection with the aqueous coating composition of the invention are also preferred embodiments of the aqueous coating composition of the invention in relation to its use for at least partly coating an electrically conductive substrate with an electrocoat material.

Method for Coating

A further subject of the present invention is a method for at least partly coating an electrically conductive substrate with an electrocoat material, comprising at least the step of:
(b1) at least partly coating the substrate with the aqueous coating composition of the invention by at least partial electrophoretic deposition of this coating composition on the substrate surface.

All preferred embodiments described hereinabove in connection with the aqueous coating composition of the invention are also preferred embodiments in relation to the use of the aqueous coating composition in step (b1) of the method of the invention The method of the invention is preferably a method for at least partly coating an electrically conductive substrate used in and/or for automobile construction. The method may take place continuously in the form of a strip coating operation, such as in the coil coating process, for example, or discontinuously.

Step (b1) of the method of the invention, i.e., the substrate is at least partly coated with the aqueous coating composition of the invention by at least partial electrophoretic deposition of this coating composition on the substrate surface, is accomplished preferably by applying an electrical voltage between the substrate and at least one counterelectrode. Step (b1) of the method of the invention is carried out preferably in a dip coating bath. The counterelectrode in this case is preferably located in the dip coating bath. Optionally, the counterelectrode may also be present separately from the dip coating bath, for example via an anionic exchange membrane which is permeable for anions. In this case, anions formed during dip coating are transported from the coating material through the membrane into the anolyte, allowing the pH in the dip coating bath to be regulated or kept constant.

In step (b1) of the method of the invention, preferably, there is full coating of the substrate with the aqueous coating composition of the invention, by complete electrophoretic deposition on the entire substrate surface.

Preferably, in step (b1) of the method of the invention, a substrate intended for at least partial coating is introduced at least partly, preferably completely, into a dip coating bath, and step (b1) is carried out in this dip coating bath.

The achievement in step (b1) of the method of the invention is at least partial coating of the substrate by an at least partial electrophoretic deposition of the aqueous coating composition inventively employed. The aqueous coating composition of the invention in this case is deposited as electrocoat material on the substrate surface.

The aqueous coating composition of the invention is preferably contacted with an electrically conducting anode and with the electrically conductive substrate connected as cathode. Alternatively, the aqueous coating composition inventively employed does not have to be brought directly into contact with an electrically conducting anode, if the anode, for example, is present separately from the dip coating bath, as for example via an anion exchange membrane which is permeable for anions.

The passage of electrical current between anode and cathode is accompanied by deposition of a firmly adhering paint film on the cathode, i.e., on the substrate. The voltage applied is preferably in a range from 50 to 500 volts.

Step (b1) of the method of the invention is carried out preferably at a dip bath temperature in a range from 20 to 45° C., more preferably in a range from 22 to 42° C., very preferably in a range from 24 to 39° C., especially preferably in a range from 26 to 36° C., with more particular preference in a range from 27 to 33° C., such as in a range from 28 to 30° C., for example. In another preferred embodiment of the method of the invention, step (b1) is carried out at a dip bath temperature of not more than 40° C., more preferably not more than 38° C., very preferably not more than 35° C., especially preferably not more than 34° C. or not more than 33° C. or not more than 32° C. or not more than 31° C. or not more than 30° C. or not more than 29° C. or not more than 28° C. In a further, different preferred embodiment of the method of the invention, step (b1) is carried out at a dip bath temperature ≤32° C. such as, for example, ≤31° C. or ≤30° C. or ≤29° C. or ≤28° C. or ≤27° C. or ≤26° C. or ≤25° C. or ≤24° C. or ≤23° C.

In step (b1) of the method of the invention, the aqueous coating composition of the invention is preferably applied such that the resulting electrocoat film has a dry film thickness in the range from 5 to 40 μm, more preferably from 10 to 30 μm.

In one preferred embodiment of the method of the invention, step (b1) is carried out in at least two successive stages (b1-a) and (b1-b) as follows:
(b1-a) at an applied voltage in a range from 1 to 50 V, and
(b1-b) at an applied voltage in a range from 50 to 400 V, with the proviso that the voltage applied in stage (b1-b) is greater by at least 10 V than the voltage applied in stage (b1-a).

Within this preferred embodiment of the present invention, an aqueous coating composition of the invention is used that further comprises at least one component (E), i.e., at least one metal ion-containing compound and/or at least one metal atom-containing compound suitable for releasing metal ions, the metal ions being ions of metal atoms selected from the group consisting of Zr, Ti, Co, V, W, Mo, Cu, Zn, In, Bi, Y, and lanthanides, more preferably Bi, and the metal ions being present in the coating composition in a concentration in the range from 30 to 20 000 ppm, based on the total weight of the coating composition in wt %.

The deposition current density in stage (b1-a) is preferably at least 1 A/m$^2$, more preferably at least 2 A/m$^2$, and more particularly at least 3 A/m$^2$, but preferably in each case not more than 20 A/m$^2$, more preferably in each case not more than 10 A/m$^2$. The deposition current density in stage (b1-a) here is preferably maintained at least for 0.5 second, more preferably at least for 10 seconds, and more particularly for at least 30 seconds, and preferably in each case for not more than 300 seconds, more preferably in each case for not more than 250 seconds, and more particularly not more than 150 seconds.

Preferably in stage (b1-b), in a time interval in the range from 0 to 300 seconds after the ending of the implementation of stage (b1-a), a voltage in the range from 50 to 400 V is applied, preferably relative to an inert counterelectrode, but with the proviso that this voltage applied in stage (b1-b) is greater by at least 10 V than the voltage applied beforehand in stage (b1-a). Within the implementation of stage (b1-b), this voltage is preferably held for a period in the range from 10 to 300 seconds at not less than a value within the stated voltage range from 50 to 400 V, subject to the proviso stated above.

The voltage increase from stage (b1-a) to stage (b1-b) may take place "suddenly", in other words, for example, by appropriately switching over to a rectifier, this requiring a certain technically related minimum period of time in order to attain the target voltage. Alternatively, the voltage increase may take place in the form of a ramp, in other words at least approximately continuously over a selectable period, as for example a period of up to 10, 20, 30, 40, 50, 60, 120, or 300 seconds. Preferred is a ramp of up to 120 seconds, more preferably of up to 60 seconds. A step like voltage increase is also possible here, in which case preferably a certain hold time at this voltage is observed for each of these voltage stages, of 1, 5, 10, or 20 seconds, for example. Also possible is a combination of ramps and steps.

The indication of a period such as, for example, of a period in the range from 10 to 300 seconds for the application of the voltage in stage (b1-b) in a range from 50 to 400 V may mean that this voltage is held constant during the stated period. Alternatively, however, this voltage may also adopt different values during the deposition time within stage (b1-b), within the stated minimum and maximum values in the range from 50 to 400 V—for example, it may swing back and forth or increase in a ramp or in steps from the minimum to the maximum deposition voltage.

The voltage, i.e., deposition voltage in stage (b1-b) may also be regulated in the form of pulses, with times without current or with a deposition voltage below the minimum level between two pulses. The pulse duration may be situated, for example, in the range from 0.1 to 10 seconds. The "period" for the deposition is then considered, preferably, to be the sum total of the durations for which the deposition voltage lies within the aforementioned maximum and minimum values when implementing step (b1-b). Ramps and pulses may also be combined with one another.

After implementation of stage (b1-a), a metal-enriched layer according to the nature of the metal ions used is formed on the electrically conductive substrate, and can be detected and quantified by X-ray fluorescence analysis, for example. The metal enriched layer thus formed preferably exerts a corrosion-preventive effect whose extend is in line with the metal layer add-on (in mg of metal per $m^2$ of surface area). Preferred layer add-ons are at least 10, preferably at least 50, and more particularly at least 150 mg of metal (calculated as metal) per $m^2$ of surface area.

The method of the invention preferably further comprises a step (b2), preferably following step (b1), which as set out above may entail two stages (b1-a) and (b1-b), as follows:

(b2) rinsing the substrate coated at least partly with the aqueous coating composition inventively employed, obtainable after step (b1), with water and/or with ultrafiltrate.

The term "ultrafiltrate" or "ultrafiltration", particularly in connection with electrodeposition coating, is familiar to the skilled person and is defined, for example, in Römpp Lexikon, Lacke and Druckfarben, Georg Thieme Verlag 1998.

The implementation of step (b2) permits the recycling of excess constituents of the aqueous coating composition inventively employed, present after step (b1) on the at least partly coated substrate, into the dip coating bath.

The method of the invention may further comprise an optional step (b3), which preferably follows step (b1) or (b2), more preferably step (b2), namely a step of (b3) contacting the substrate at least partly coated with the aqueous coating composition inventively employed, obtainable after step (b1) or step (b2), preferably after step (b2), with water and/or ultrafiltrate, preferably over a time of 30 seconds up to one hour, more preferably over a time of 30 seconds up to 30 minutes.

In one preferred embodiment the method of the invention further comprises at least one step (b4), which preferably follows step (b1) and/or (b2) and/or (b3), but is preferably carried out before an optional step (b5), as follows:

(b4) applying at least one further coating film to the substrate coated at least partly with the aqueous coating composition inventively employed and obtainable after step (b1) and/or (b2) and/or (b3).

By means of step (b4) it is possible for one or more further coating films to be applied to the substrate at least partly coated with the aqueous coating composition inventively employed and obtainable after step (b1) and/or (b2) and/or (b3). If two or more coats are to be applied, step (b4) may be repeated as often accordingly. Examples of further coating films for application are, for example, basecoat films, surfacer films and/or single-coat or multicoat topcoat films. The aqueous coating composition inventively employed applied by step (b1), optionally after having been subjected to an optional rinse with water and/or ultrafiltrate (as per step (b2)), can be cured, this curing taking place as described below as per step (b5), before a further coat is applied such as a basecoat film, surfacer film and/or a single-coat or multicoat topcoat film. Alternatively, however, the aqueous coating composition inventively employed applied by step (b1), optionally after having been subjected to an optional rinse with water and/or ultrafiltrate (as per step (b2)), may not be cured, but instead a further coat may be applied such as a basecoat film, surfacer film and/or a single-coat or multicoat topcoat film ("wet-on-wet method"). In this case, following application of this or these further coat(s), the overall system thus obtained is cured, it being possible for this curing to take place as described below, preferably in accordance with a step (b5).

In one preferred embodiment the method of the invention further comprises at least one step (b5), as follows:

(b5) curing the aqueous coating composition inventively employed applied at least partly to the substrate after step (b1) and/or (b2) and/or (b3), or the coating applied at least partly to the substrate after step (b1) and/or (b2) and/or (b3) and/or (b4).

Step (b5) of the method of the invention is carried out preferably by means of baking after step (b1) or optionally only after at least one further step (b4). Step (b5) takes place preferably in an oven. The curing here takes place preferably at a substrate temperature in the range from 140° C. to 200°

C., more preferably in a range from 150° C. to 190° C., very preferably in a range from 160° C. to 180° C. Step (b5) takes place preferably over a duration of at least 2 minutes to 2 hours, more preferably over a duration of at least 5 minutes to 1 hour, very preferably over a duration of at least 10 minutes to 30 minutes.

At Least Partly Coated Substrate

A further subject of the present invention is an electrically conductive substrate coated at least partly with the aqueous coating composition of the invention.

A further subject of the present invention is an article or a component produced from at least one such substrate.

Such articles may be, for example, metal strips. Components of this kind may be, for example, bodies and body parts of vehicles such as automobiles, trucks, motorcycles, buses, and coaches, and components of electrical household products, or else components from the area of apparatus claddings, façade claddings, ceiling claddings, or window profiles.

The present invention further relates to a component or article, preferably a metallic component, produced from at least one at least partly coated substrate which is electrically conductive and which is obtainable in accordance with the method of the invention.

Determination Methods

1. Copper-Accelerated Acetic Acid Salt Spray Mist Testing to DIN EN ISO 9227 CASS The copper-accelerated acetic acid salt spray mist test is used for determining the corrosion resistance of a coating on a substrate. In accordance with DIN EN ISO 9227 CASS, the copper-accelerated acetic acid salt spray mist test is carried out for aluminum (AA6014 (ALU)) as electrically conductive substrate, coated with an inventive coating composition or with a comparative coating composition. In this test, the samples under investigation are in a chamber in which there is continuous misting of a 5% strength common salt solution, with controlled pH, at a temperature of 50° C. over a duration of 240 hours, the salt solution being admixed with copper chloride and acetic acid. The mist deposits on the samples under investigation, covering them with a corrosive film of salt water. After the copper-accelerated acetic acid salt spray mist test has been carried out to DIN EN ISO 9227 CASS, the samples have their rust level assessed in accordance with DIN EN ISO 4628-3. The assessment is made on the basis of characteristic values in the range from 0 (no rust) to 5 (very high rust level). If, still prior to the copper-accelerated acetic acid salt spray mist testing to DIN EN ISO 9227 CASS, the coating on the samples under investigation is scored down to the substrate with a blade incision, the samples can be investigated for their level of corrosive undermining in accordance with DIN EN ISO 4628-8, since the substrate corrodes along the score line during the copper-accelerated acetic acid salt spray mist test to DIN EN ISO 9227 CASS. As a result of the progressive process of corrosion, the coating is undermined to a greater or lesser extent during the test. The extent of undermining in [mm] is a measure of the resistance of the coating.

2. VDA Alternating Climate Test to VDA 621-415 [German Automakers Association]

This alternating climate test is used for determining the corrosion resistance of a coating on a substrate. The alternating climate test is carried out for hot dip-galvanized steel (HDG) as electrically conductive substrate, coated with an inventive coating composition or with a comparative coating composition. The alternating climate test is carried out in 10 cycles. One cycle here consists of a total of 168 hours (1 week) and encompasses a) 24 hours of salt spray mist testing as per DIN EN ISO 9227,
b) followed by 8 hours of storage under constant conditions as per DIN 50017,
c) followed by 16 hours of storage under ambient conditions as per DIN 50014,
d) 3-fold repetition of b) and c) (hence in total 72 hours), and
e) 48 hours of storage under ambient conditions as per DIN 50014.

After the alternating climate test has been carried out, the sample in question is investigated for assessment of its rust level according to DIN EN ISO 4628-3. The assessment is made on the basis of characteristic values in the range from 0 (no rust) to 5 (very high rust level). If, still prior to the performance of the alternating climate test, the baked coating composition on the samples under investigation is scored down to the substrate with a blade incision, the samples can be investigated for their level of corrosive undermining to DIN EN ISO 4628-8 since the substrate corrodes along the score line during the performance of the alternating climate test. As a result of the progressive process of corrosion, the coating is undermined to a greater or lesser extent during the test. The extent of undermining in [mm] is a measure of the resistance of the coating to corrosion.

The examples below serve to illustrate the invention, and should not be interpreted as imposing any restriction.

Unless otherwise noted, the figures in percent are in each case percentages by weight.

INVENTIVE AND COMPARATIVE EXAMPLES

1. Production of Sol-Gel Compositions Used Inventively as Component (B)

Aqueous Sol-Gel Composition S1

A mixture of 77.5 g of tetraethoxysilane (TEOS), 77.5 g of methyltriethoxysilane (MTEOS), 155.0 g of 3-glycidylpropyltrimethoxysilane (GLYMO), 38.8 g of Snowtex®-O (colloidal $SiO_2$), 4603.0 g of DI water and 9.5 g of formic acid (85 wt %) is stirred at room temperature (18-23° C.) for 168 hours. Thereafter the mixture, with stirring, is admixed with 38.75 g of 3-aminopropyltriethoxysilane (AMEO) and stirred at room temperature for a further 168 hours. This gives a clear, slightly yellowish solution having a pH of 5.0.

Aqueous Sol-Gel Composition S2.

A mixture of 80.7 g of tetraethoxysilane (TEOS), 80.7 g of methyltriethoxysilane (MTEOS), 161.4 g of 3-glycidylpropyltrimethoxysilane (GLYMO), 4626.9 g of DI water and 10.0 g of formic acid (85 wt %) is stirred at room temperature (18-23° C.) for 168 hours. Thereafter the mixture, with stirring, is admixed with 40.4 g of 3-aminopropyltriethoxysilane (AMEO) and stirred at room temperature for a further 168 hours. This gives a clear, slightly yellowish solution having a pH of 5.0.

Table 1 provides an overview of the aqueous sol-gel compositions S1 and S2.

TABLE 1

| Sol-gel composition | S1 | S2 |
|---|---|---|
| TEOS/wt % | 1.55 | 1.61 |
| MTEOS/wt % | 1.55 | 1.61 |
| GLYMO/wt % | 3.10 | 3.23 |
| Snowtex ®-O/wt % | 0.78 | — |
| Formic acid (85 wt %)/wt % | 0.19 | 0.20 |
| Deionized water/wt % | 92.05 | 92.54 |

TABLE 1-continued

| Sol-gel composition | S1 | S2 |
|---|---|---|
| AMEO/wt % | 0.78 | 0.81 |
| Solids content (calculated)/wt % | 4.00 | 4.00 |

The wt % figures are based in each case on the total weight of the aqueous sol-gel composition.

As is evident from table 1, the sol-gel composition S2 has a calculated solids content of 4.00 wt %, based on the total weight of composition S2. In the case of S2, this solids content is the sum total of the calculated solids contents for the individual components TEOS, MTEOS and GLYMO, and also AMEO, that are used.

Determined by way of example below is the theoretically calculated solids content of TEOS (empirical formula $C_8H_{20}O_4Si$) within S2. It is calculated using the general formula $$SC_{theo} = \frac{M_{cond}}{M_{start}} \cdot fraction_{formula}$$

in which
$SC_{theo}$=theoretically calculated solids content of TEOS in S1 in wt %
$M_{cond}$=60.05 g/mol (molar mass of TEOS in fully condensed form; corresponds to an empirical formula of O(4/2)Si)
$M_{start}$=208.33 g/mol (molar mass of TEOS)
$Fraction_{formula}$=1.61 wt % (fraction of TEOS in the composition in wt %).

This gives a theoretically calculated solids content of 0.46 wt % for TEOS. In a similar way, a corresponding calculation can be made for MTEOS and GLYMO and also AMEO. Overall, accordingly, the total theoretically calculated solids content for S2 is 4.00 wt % (see table 1).

2. Production of Inventive Aqueous Coating Compositions (Z1 and Z2) and an Aqueous Comparative Coating Composition Z3

An aqueous dispersion (A) of a binder and of a crosslinking agent and of a pigment paste is admixed either with the sol-gel composition S1 or with the sol-gel composition S2 at room temperature (18-23° C.) with stirring, to give the inventive aqueous coating compositions Z1 and Z2. In each of these cases a total of 2215 g of the aqueous dispersion (A), 295 g of pigment paste, 1552.5 g of deionized water, and 937.5 g of S1 or S2 are used. Furthermore, an aqueous comparative coating composition Z3 is produced from an aqueous dispersion of a binder (A) (2215 g), deionized water (2490 g) and a pigment paste (295 g), i.e., a corresponding coating composition which contains no sol-gel composition.

Table 2 provides an overview of the inventive aqueous coating compositions Z1 and Z2 and of the aqueous comparative coating composition Z3:

TABLE 2

| | Examples Z1 and Z2 of aqueous coating compositions, and comparative example Z3 | | |
|---|---|---|---|
| | Z1 | Z2 | Z3* |
| Aqueous dispersion (A) of a binder and of a crosslinking agent/wt % | 44.3 | 44.3 | 44.3 |
| S1/wt % | 18.75 | — | — |
| S2/wt % | — | 18.75 | — |
| Deionized water/wt % | 31.05 | 31.05 | 49.8 |
| Pigment paste/wt % | 5.9 | 5.9 | 5.9 |

*= not inventive

Aqueous dispersion (A) used is the commercially available product CathoGuard® 520 from BASF. This aqueous dispersion employed has a solids content of 37.5 wt %.

3. Production of Coated Electrically Conductive Substrates with the Inventive Aqueous Coating Compositions Z1 and Z2 and with the Comparative Coating Composition Z3

The aqueous coating compositions Z1 and Z2, and Z3, are each applied as dipping varnish coatings to different substrates. Each of the inventive aqueous coating compositions Z1 and Z2 is stirred, directly after its production, for a time of 24 hours at room temperature (18-23° C.), and then applied to the various substrates. Moreover, each of the inventive aqueous coating compositions Z1 and Z2 is stirred, directly after its production, for 14 days at room temperature (18-23° C.) and only then applied to the various substrates, in order to allow the behavior of the dipping varnish coatings thus applied to be investigated as a function of time.

Two kinds of metal test panels, namely T1 (hot dip-galvanized steel (HDG)) and T2 (aluminum AA6014 (ALU)), are used as examples of electrically conductive substrates.

These panels are first of all each cleaned by immersing them into a bath containing an aqueous solution containing the commercially available products Ridoline 1565-1 (3.0 wt %) and Ridosol 1400-1 (0.3 wt %) from Henkel, and also water (96.7 wt %), for a time of 1.5 minutes at a temperature of 62° C. This is followed by mechanical cleaning (using fine brushes), after which the panels are again immersed into the bath for a time of 1.5 minutes.

The substrates cleaned in this way are subsequently rinsed with water (for a time of 1 minute) and with deionized water (for a time of 1 minute).

Immediately thereafter, one of the inventive aqueous coating compositions Z1 and Z2, or a comparative coating composition Z3, is applied to each panel T1 and T2, by a process of immersing the respective panel in each case into a corresponding dip coating bath comprising one of the compositions Z1 or Z2 or Z3. This dip coating bath has a temperature in each case of 32° C. The stirring speed is 600 revolutions per minute.

The resulting coatings are subsequently baked at 175° C. (oven temperature) for a time of 25 minutes.

In this way, overall, ten coated substrates different from one another are obtained.

Tables 3a and 3b provide an overview of the resulting coated substrates.

TABLE 3a

|  | Inventive example B1a* | Inventive example B1b# | Inventive example B2a* | Inventive example B2b# | Comparative example C1* |
|---|---|---|---|---|---|
| Substrate | T1 (HDG) | T1 (HDG) | T1 (HDG) | T1 (HDG) | T1 (HDG) |
| Aqueous coating composition used | Z1 | Z1 | Z2 | Z2 | Z3 |

*= Application 24 h after production of aqueous coating composition to the substrate
= Application 14 days after production of aqueous coating composition to the substrate TABLE 3b

|  | Inventive example B1c* | Inventive example B1d# | Inventive example B2c* | Inventive example B2d# | Comparative example C2* |
|---|---|---|---|---|---|
| Substrate | T2 (ALU) | T2 (ALU) | T2 (ALU) | T2 (ALU) | T2 (ALU) |
| Aqueous coating composition used | Z1 | Z1 | Z2 | Z2 | Z3 |

*= Application 24 h after production of aqueous coating composition to the substrate
= Application 14 days after production of aqueous coating composition to the substrate The dry film thicknesses of the aqueous coating compositions of the invention, baked onto the respective substrates, are in each case 20 μm.

4. Investigation of the Corrosion Prevention Effect of the Coated Substrates

All of the tests below were carried out in accordance with the determination methods specified above and with the corresponding standard. Each value in table 4 or table 5 is the average (with standard deviation) from a three-fold determination.

TABLE 4

|  | Inventive example B1a | Inventive example B1b | Inventive example B2a | Inventive example B2b | Comparative example C1 |
|---|---|---|---|---|---|
| Substrate | T1 (HDG) | T1 (HDG) | T1 (HDG) | T1 (HDG) | T1 (HDG) |
| VDA alternating climate test to VDA 621-415, 10 cycles | $3.3 \pm 0.4^a$ $0.3 \pm 0.6^b$ | $3.3 \pm 0.2^a$ $0.3 \pm 0.6^b$ | $3.4 \pm 0.4^a$ $0.0 \pm 0.0^b$ | $3.4 \pm 0.3^a$ $0.0 \pm 0.0^b$ | $4.7 \pm 0.5^a$ $0.3 \pm 0.6^b$ |

$^a$= Undermining [mm] as per DIN EN ISO 4628-8
$^b$= Surface rust as per DIN EN ISO 4628-3

TABLE 5

|  | Inventive example B1c | Inventive example B1d | Inventive example B2c | Inventive example B2d | Comparative example C2 |
|---|---|---|---|---|---|
| Substrate | T2 (ALU) | T2 (ALU) | T2 (ALU) | T2 (ALU) | T2 (ALU) |
| Copper-accelerated acetic acid salt spray mist test (DIN EN ISO 9227 CASS), 240 h | $1.3 \pm 0.1^a$ $1.0 \pm 0^b$ | $1.2 \pm 0.2^a$ $1.0 \pm 0^b$ | $1.0 \pm 0.1^a$ $1.0 \pm 0^b$ | $0.9 \pm 0.1^a$ $1.0 \pm 0^b$ | $3.7 \pm 0.2^a$ $2.7 \pm 1.2^b$ |

$^a$= Undermining [mm] as per DIN EN ISO 4628-8
$^b$= Surface rust as per DIN EN ISO 4628-3

As is apparent from tables 4 and 5, the substrates coated using the aqueous coating composition of the invention, in comparison to the comparative examples C1 and C2, are consistently notable for improved corrosion prevention effect. In particular it is evident, for example, that the undermining in [mm] after performance of the VDA alternating climate test (inventive examples B1a, B1b, B2a and B2b vs. comparative example C1) and, respectively, after performance of the copper-accelerated acetic acid salt spray mist test to DIN EN ISO 9227 CASS (inventive examples B1c, B1d, B2c and B2d vs. comparative example C2) may be lower by more than 75%. Furthermore, in particular, inventive examples B1a, B1b, B2a and B2b show, in comparison to comparative example C2, substantially less surface rust after implementation of the copper-accelerated acetic acid salt spray mist test to DIN EN ISO 9227 CASS.

What is claimed is:

1. An aqueous coating composition, comprising
(A) at least one aqueous dispersion or solution of at least one electrophoretically depositable binder and optionally of at least one crosslinking agent, and
(B) at least one aqueous sol-gel composition,
for at least partly coating an electrically conductive substrate with an electrocoat material,
the electrophoretically depositable binder being cathodically depositable and being a polymeric resin which has reactive functional groups which permit a crosslinking reaction with the crosslinking agent optionally present, and
the at least one starting compound having at least one metal atom and/or semimetal atom and at least two hydrolyzable groups, and at least one nonhydrolyzable organic radical,
wherein the sol-gel composition (B) used for preparing the aqueous coating composition is obtained by reacting with water,
at least one compound $Si(X^1)_3(R^1)$ as at least one compound (A1), where $R^1$ therein is a nonhydrolyzable $C_1$-$C_{10}$ aliphatic organic radical which has at least one epoxide group as reactive functional group,
at least one compound $Si(X^1)_3(R^1)$ as at least one further compound (A1), where $R^1$ therein is a nonhydrolyzable $C_1$-$C_{10}$ aliphatic organic radical which has at least one reactive functional group selected from the group consisting of primary amino groups and secondary amino groups,
at least one compound $Si(X^1)_4$ as at least one further compound (A1), and
at least one compound $Si(X^1)_3(R^1)$ as at least one further compound (A1),
where $R^1$ therein is a nonhydrolyzable organic $C_1$-$C_{10}$ aliphatic radical which has no reactive functional group and $X^1$ is a hydrolysable group.

2. An aqueous coating composition comprising
(A) at least one aqueous dispersion or solution of at least one electrophoretically depositable binder and optionally of at least one crosslinking agent, and
(B) at least one aqueous sol-gel composition,
for at least partly coating an electrically conductive substrate with an electrocoat material,
the electrophoretically depositable binder being cathodically depositable and being a polymeric resin which has reactive functional groups which permit a crosslinking reaction with the crosslinking agent optionally present, and
the aqueous sol-gel composition (B) being obtained by reaction of at least one starting compound suitable for preparing the sol-gel composition (B) with water, with hydrolysis and condensation of the at least one starting compound,
the at least one starting compound having at least one metal atom and/or semimetal atom and at least two hydrolyzable groups, and at least one nonhydrolyzable organic radical,
wherein the aqueous sol-gel composition (B) has at least two different non-hydrolyzable organic radicals, where one of these radicals is a $C_1$-$C_{10}$ aliphatic radical which has at least one hydroxyl group as at least one reactive functional group, and the remaining nonhydrolyzable organic radical is a $C_1$-$C_{10}$ aliphatic radical which has at least one primary amino group or at least one secondary amino group as at least one reactive functional group.

3. A method for at least partly coating an electrically conductive substrate with an electrocoat material, comprising
(b1) at least partly coating the substrate with an aqueous coating composition at least partial electrophoretic deposition, wherein the aqueous coating composition comprises
(A) at least one aqueous dispersion or solution of at least one electrophoretically depositable binder and optionally of at least one crosslinking agent, and
(B) at least one aqueous sol-gel composition,
the electrophoretically depositable binder being cathodically depositable and being a polymeric resin which has reactive functional groups which permit a crosslinking reaction with the crosslinking agent optionally present, and
the aqueous sol-gel composition (B) being obtained by reaction of at least one starting compound suitable for preparing the sol-gel composition (B) with water, with hydrolysis and condensation of the at least one starting compound,
the at least one starting compound having at least one metal atom and/or semimetal atom and at least two hydrolyzable groups, and at least one nonhydrolyzable organic radical.

4. The method as claimed in claim 3, wherein the sol-gel composition (B) present in the aqueous coating composition, after hydrolysis and condensation of the at least one starting compound, has a solids content in the range from 0.1 to 40 wt %, based on the total weight of the aqueous coating composition.

5. The method as claimed in claim 3, wherein the sol-gel composition (B) used for preparing the aqueous coating composition is obtained by reacting at least one compound $$(M^1)^x(X^1)_a(R^1), \quad (A1)$$

and/or $$(M^2)^y(X^2)_b(R^2)(R^3) \quad (A2)$$

with water, in which
$M^1$ and $M^2$ each independently of one another are a metal atom or a semimetal atom,
$X^1$ and $X^2$ each independently of one another are a hydrolyzable group,
x is the valence of the metal atom or semimetal atom $M^1$,
y is the valence of the metal atom or semimetal atom $M^2$,
$R^1$ is $X^1$, a nonhydrolyzable organic radical, $(T)(M^1)^x(X^1)_c$, or $(U)[(M^1)^x(X^1)_c]_2$,
$R^2$ is a nonhydrolyzable organic radical,
$R^3$ is a nonhydrolyzable organic radical, $(T)(M^1)^x(X^1)_c$, $(U)[(M^1)^x(X^1)_c]_2$, $(V)(M^2)^y(X^2)_d(R^2)$, or $(W)[(M^2)^y(X^2)_d(R^2)]_2$,
a is x if $R^1$ is $X^1$ or
a is x-1 if $R^1$ is a nonhydrolyzable organic radical, $(T)(M^1)^x(X^1)_c$, or $(U)[(M^1)^x(X^1)_c]_2$, in each case with the proviso that a is at least 2,
B is y-2,
with the proviso that b is at least 2,
T, U, V and W in each case independently of one another are each a radical which has 1 to 30 carbon atoms and may optionally have up to 10 heteroatoms and heteroatom groups selected from the group consisting of O, S and N,
c is x-1, and
d is y-2.

6. The method as claimed in claim 5, wherein
$X^1$ and $X^2$ are selected each independently of one another from the group consisting of halides and alkoxy groups O—$R^a$, in which $R^a$ in each case is a $C_{1-16}$ aliphatic radical, and
$M^1$ and $M^2$ are selected each independently of one another from the group consisting of Al, Ti, Zr, Fe, B, and Si.

7. The method as claimed in claim 5, wherein
at least one compound (A1) is used as at least one starting compound in which $R^1$ is a nonhydrolyzable organic radical which has at least one reactive functional group selected from the group consisting of primary amino groups, secondary amino groups, epoxide groups, thiol groups, isocyanate groups, phosphorus-containing groups, and groups which have an ethylenically unsaturated double bond, and optionally
at least one further compound (A1) is used as at least one starting compound in which $R^1$ is $X^1$, and optionally
at least one further compound (A1) is used as at least one starting compound in which $R^1$ is a nonhydrolyzable organic radical which has no reactive functional group.

8. The method as claimed in claim 3, wherein the sol-gel composition (B) used for preparing the aqueous coating composition is obtained by reacting with water at least one compound $Si(X^1)_3(R^1)$ as at least one compound (A1),
where $R^1$ therein is a nonhydrolyzable organic radical which has at least one reactive functional group selected from the group consisting of primary amino groups, secondary amino groups, epoxide groups, and groups which have an ethylenically unsaturated double bond,
and optionally at least one compound $Si(X^1)_4$ is used as at least one further compound (A1), and optionally
at least one compound $Si(X^1)_3(R^1)$ is used as at least one further compound (A1),
where $R^1$ therein is a nonhydrolyzable organic radical which has no reactive functional group and $X^1$ is a hydrolysable group.

9. The method as claimed in claim 3, wherein the coating composition comprises at least one metal ion-containing compound and/or at least one metal atom-containing compound suitable for releasing metal ions, the metal ions being ions of metal atoms selected from the group consisting of Zr, Ti, Co, V, W, Mo, Cu, Zn, In, Bi, Y, and lanthanides, and the metal ions being present in the coating composition in a concentration in the range from 30 to 20 000 ppm, based on the total weight of the coating composition in wt %.

10. The method as claimed in claim 3, wherein step (b1) is carried out in at least two successive stages (b1-a) and (b1-b) and said aqueous coating composition is used, where
- (b1-a) is carried out at an applied voltage in a range from 1 to 50 V, and
- (b1-b) is carried out at an applied voltage in a range from 50 to 400 V, with the proviso that the voltage applied in stage (b1-b) is greater by at least 10 V than the voltage applied in stage (b1-a).

* * * * *

UNITED STATES PATENT AND TRADEMARK OFFICE
CERTIFICATE OF CORRECTION

PATENT NO. : 10,208,213 B2
APPLICATION NO. : 14/911646
DATED : February 19, 2019
INVENTOR(S) : Sebastian Sinnwell et al.

It is certified that error appears in the above-identified patent and that said Letters Patent is hereby corrected as shown below:

On the Title Page

Column 2, item (56), under OTHER PUBLICATIONS, Line 7, "steer" should read --steel--;
    Line 3, item (57), under ABSTRACT, after "one" insert --dispersion, of at least one--.

In the Specification

Column 5, Line 50, "to 100" should read --1 to 100--.

Column 6, Line 60, "80° C.," should read --≥ 80° C.,--;
    Line 61, "110° C.," should read --≥ 110° C.,--;
    Line 61, "130°C.," should read --≥ 130° C.,--;
    Line 62, "140° C.," should read --≥ 140°C.--.

Signed and Sealed this
Tenth Day of December, 2019

Andrei Iancu
*Director of the United States Patent and Trademark Office*